United States Patent
Nakagawa et al.

(10) Patent No.: US 7,215,979 B2
(45) Date of Patent: May 8, 2007

(54) TRANSMITTER APPARATUS AND RADIO COMMUNICATION METHOD

(75) Inventors: Yoichi Nakagawa, Ota-ku (JP); Masayuki Orihashi, Funabashi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/531,112

(22) PCT Filed: Feb. 12, 2004

(86) PCT No.: PCT/JP2004/001449

§ 371 (c)(1), (2), (4) Date: Apr. 13, 2005

(87) PCT Pub. No.: WO2004/073226

PCT Pub. Date: Aug. 26, 2004

(65) Prior Publication Data

US 2006/0003710 A1    Jan. 5, 2006

(30) Foreign Application Priority Data

Feb. 12, 2003 (JP) .............................. 2003-033385
Feb. 6, 2004 (JP) .............................. 2004-030349

(51) Int. Cl.
*H04M 1/00* (2006.01)

(52) U.S. Cl. ..................... 455/562.1; 370/328; 455/517

(58) Field of Classification Search .............. 455/63.4, 455/505, 562.1; 375/144, 148, 346, 347, 375/348

See application file for complete search history.

(56) References Cited

U.S. PATENT DOCUMENTS 6,463,105 B1 * 10/2002 Ramesh ...................... 375/262
6,850,741 B2 * 2/2005 Lei et al. ..................... 455/101
6,996,380 B2 * 2/2006 Dent ........................... 455/101

FOREIGN PATENT DOCUMENTS

| JP | 2001-506833 | 5/2001 |
|----|-------------|--------|
| JP | 2002-503048 | 1/2002 |
| JP | 2002-077980 | 3/2002 |
| JP | 2002-077986 | 3/2002 |
| JP | 2002-152191 | 5/2002 |
| JP | 2002-261670 | 9/2002 |
| JP | 2003-023380 | 1/2003 |
| JP | 2004-120730 | 4/2004 |
| JP | 2004-135302 | 4/2004 |
| WO | WO 99/14870 | 3/1999 |

OTHER PUBLICATIONS

M. Horiike, et al., "The Institute of Electronics, Information and Communication Engineers, Technical Report", Shingaku Gihou vol. 102, No. 374, Oct. 18, 2002 (w/partial translation).
International Search Report corresponding to application No. PCT/JP2004/001449 dated Jun. 8, 2004.

* cited by examiner

Primary Examiner—Lester G. Kincaid
Assistant Examiner—Gary Au
(74) Attorney, Agent, or Firm—RatnerPrestia

(57) ABSTRACT

A radio station equipped with an array antenna, when transmitting an information symbol sequence to a particular radio station, uses a plurality of vectors, which are produced based on a propagation channel characteristic established between these radio stations, to simultaneously transmit a plurality of symbol sequences, which include the information symbol sequence, by way of vector multiplexing, thereby causing the particular radio station to receive the information symbol sequence, while causing other radio stations of different propagation channels to simultaneously receive a part or all the plurality of symbol sequences. Thus, when data is transmitted to a particular radio station via a radio communication channel, the concealment of information can be secured with a high level of security.

9 Claims, 17 Drawing Sheets

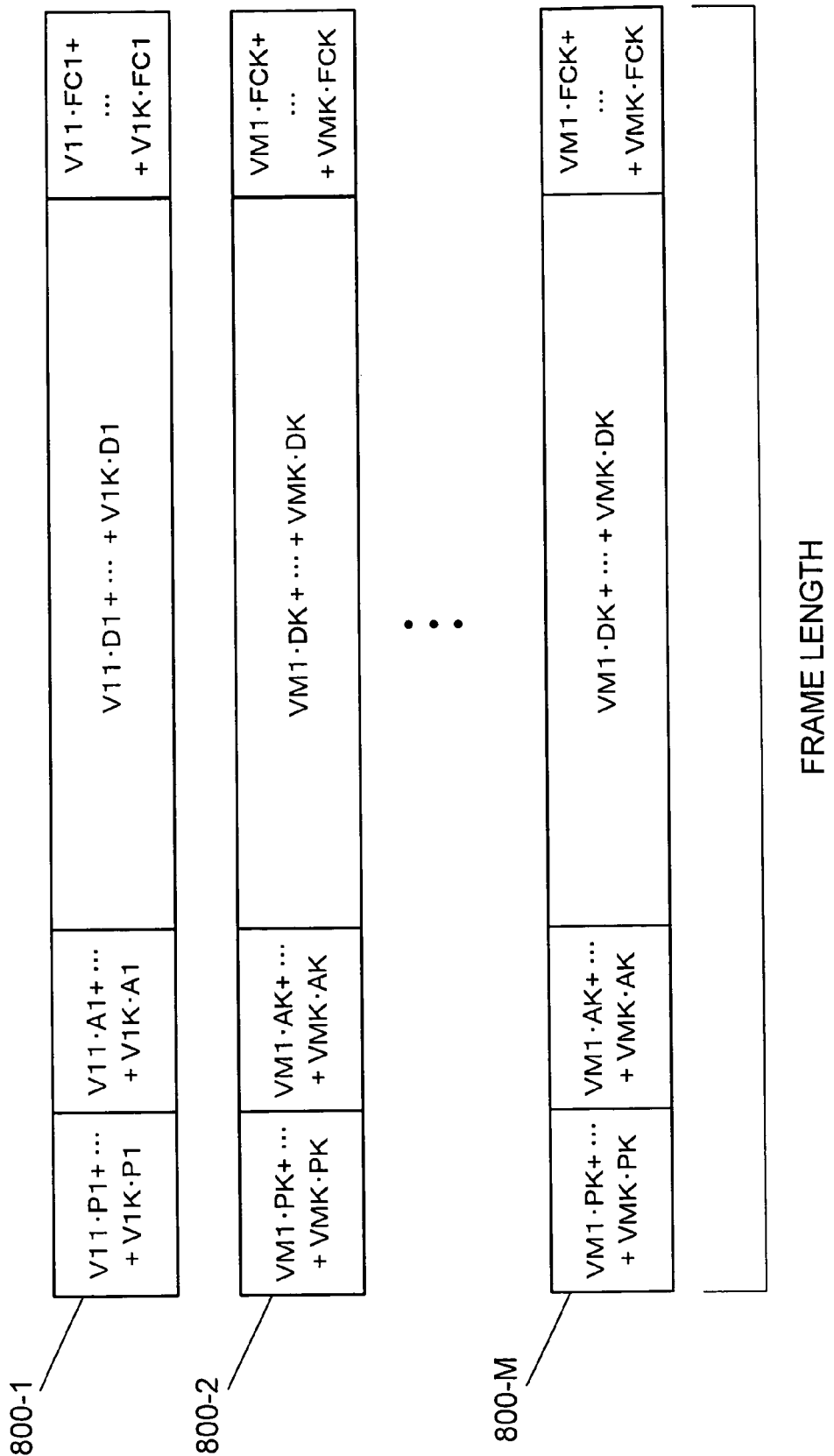

ures of radio stations. The parameters describing the
TRANSMITTER APPARATUS AND RADIO COMMUNICATION METHOD THIS APPLICATION IS A U.S. NATIONAL PHASE APPLICATION OF PCT INTERNATIONAL APPLICATION PCT/JP2004/001449.

TECHNICAL FIELD

The present invention relates to a transmitter apparatus and radio communication method for transmitting the information requiring concealment at between particular radio stations by way of a radio communication channel.

BACKGROUND ART

Recently, digital radio communication has occupied the important position in the telecommunication field by virtue of its drastic improvement in transmission speed and quality. Meanwhile, radio communication, making use of a radio wave space as a public property, involves a fundamental drawback that interception might be by a third party when considered from a concealment point of view. Namely, there always exists a fear that the communication content be intercepted by and leaked of information to the third party.

Accordingly, the conventional radio communication is devised by encrypting information in such a manner that, should communication data be intercepted by a third party, information content could not be known to the third party. Encryption is now under study and applied in various fields. This is owing to the benefit of encryption that a constant level of security is to be secured without modifying the communication system.

However, information encryption involves a problem that information is comparatively easy to crack where the encryption code or its procedure becomes aware of. Particularly, in the existing situation that high-speed computers are generally in widespread dissemination, security is not to be secured without the use of a significantly complicated encryption process.

To cope with the problem encountered in such an encryption art, there is proposed a radio transmission scheme with high level of concealment based upon the notice to the physical feature of a propagation channel, that is, radio wave propagation medium (e.g. JP-A-2002-152191). According to this method, communication data is exchanged by taking into account the propagation channel characteristic shared between the particular radio stations. Because of the impossibility to receive or restore the data at other radio stations having different propagation channels, security can be obtained on the physical layer of radio communication. Meanwhile there is another art that a secret key is shared between particular radio stations in order to encrypt data based upon a propagation channel having a characteristic unique to those, thereby preventing the third party from eavesdropping (e.g. Motoki Horiike and three others, "A Scheme of Secret Key Agreement Based on the Random Fluctuation of Channel Characteristics in Land Mobile Radio", Shingaku-giho, RCS2002-173, October 2002).

In those radio transmission schemes making use of the randomness over the radio transmission channel, the communication data requiring concealment can be prevented from being intercepted by raising the probability of error occurrences over the transmission channel upon an interception by a third party. Accordingly, communication is made possible with higher security by combining it with an information source key encryption technique in general utilization.

In the mobile communication system of cellular telephony or WLAN, the propagation channel characteristic between two radio stations, usually, is characterized by the spatial locations of radio stations. The parameters describing the propagation channel characteristic uses amplitude/phase, arrival wave directions, delay time, polarization and so on. In case the propagation channel between particular radio stations can be uniquely characterized by use of those parameters, communication could be realized with concealment by taking propagation parameters into consideration. The uniqueness can be considered enhanced furthermore by increasing the number of parameters and expressing the propagation channel characteristic by means of a multi-dimensional parameter.

However, where implementing radio communication while taking into consideration the propagation parameters estimated from the propagation channel between the radio stations, in case attempted to increase the number of parameters or improve the estimation accuracy of parameters for improving concealment, there arises a problem that higher accuracy is required for the hardware besides the increased amount of signal processing.

Meanwhile, in the case of producing a common key for use in encryption depending upon the propagation parameters, both the two radio stations are required to execute the process of propagation parameter estimation and key production. For example, assuming the communication between the base station and the terminal, there is a problematic need to improve the hardware accuracy of the communication terminal on a tendency toward upgraded functions, particularly, as to applications and interfaces, in order to increase signal processing amount and ensure estimation accuracy.

DISCLOSURE OF THE INVENTION

The present invention is for solving the problem in the prior art, and it is an object thereof to provide a transmitter apparatus and radio communication method capable of preventing the data requiring concealment from leaking to a third party over the communication channel without the need for an encryption process, etc. using a propagation parameter after estimating the propagation parameter featuring a propagation channel of between particular radio stations for communication.

In the radio communication method of the invention, a radio station having an array antenna, upon transmitting data wirelessly to a particular radio station that communication is desired, is allowed to transmit, with vector multiplexing, a plurality of ones of data simultaneously besides to-be-notified data by use of a vector space featuring a propagation channel of between the radio stations. At the particular radio station as the opposite of communication, only a desired to-be-notified data sequence is to be received while securing a constant channel quality owing to an array antenna gain. Furthermore, at another radio station as a third party, a plurality of ones of data are to be simultaneously received in addition to the to-be-notified data. Due to this, other radio station as a third party is to receive a signal containing a plurality of ones of data as interference signal components, i.e. deteriorated in SINR (Signal to Interference and Noise Ratio). This raises the probability of error occurrences in the demodulated signal sequences, making it difficult to extract and correctly restore the particular data transmitted between particular radio stations.

In this manner, the data sequence requiring concealment can be prevented from leaking to a third party over the transmission channel of radio communication without the need of encryption processing, etc. using the propagation parameter after estimating the propagation parameter featuring a propagation channel of between the particular communicating radio stations.

A transmitter apparatus of the invention is a transmitter apparatus for transmitting an information symbol sequence from a first radio station having an array antenna having M (M>1) elements to a second radio station, the transmitter apparatus comprising: vector control means for producing a plurality of N (N<=M) dimensional vectors depending upon a propagation parameter featuring a propagation channel of between the first radio station and the second radio station; and vector multiplexing means for producing vector-multiplexed symbol sequences in the number of N multiplexed by multiplying the plurality of N dimensional vectors on a plurality of symbol sequences containing the information symbol sequence; whereby the vector control means transmits, at the array antenna, the vector-multiplexed symbol sequences set such that, at the second radio station, a particular symbol sequence only is to be received of among a plurality of the symbol sequences whereas other symbol sequences are to be canceled.

Due to this, where there exist the first radio station for transmitting the information symbol sequence and another radio station being not the second radio station, the other radio station is to receive part or all of the plurality of symbols. Hence, the other radio station is made difficult to restore the information symbol sequence. Thus, information leakage is prevented and communication security is ensured.

Meanwhile, a transmitter apparatus according to the invention further comprises propagation channel analyzing means for producing a propagation channel matrix as the propagation parameter, the vector control means being to produce a plurality of N dimensional vectors obtained by singular-value decomposition of the propagation channel matrix.

Due to this, because the second radio station is allowed to receive the information symbol sequence without undergoing interference from other symbol sequences, communication quality of the radio channel can be improved.

Meanwhile, a transmitter apparatus according to the invention further comprises propagation channel analyzing means for producing a propagation channel matrix as the propagation parameter, the vector control means being to produce a plurality of N dimensional vectors obtained by eigen-value decomposition of the correlation matrix of the propagation channel matrix.

Due to this, because the gain of the M-element array antenna held by the first radio station can be maximized on the propagation channel, link budget of the radio channel can be improved.

Meanwhile, a transmitter apparatus according to the invention further comprises reference symbol producing means for producing a reference symbol known also to the communicating terminal and propagation channel information receiving means for receiving information about propagation parameter transmitted from the communicating terminal and determining the propagation parameter, the information about propagation parameter being produced from a propagation parameter the communicating terminal determined from the reference symbol transmitted from the base station.

Due to this, because it is possible to correctly obtain the information about a propagation channel for the communicating-terminal antenna as viewed from the base station array antenna, the performance can be maintained even under such a condition that the asymmetry of downlink and uplink is not negligible.

Meanwhile, a transmitter apparatus according to the invention is a transmitter apparatus wherein the plurality of symbol sequences, in part or all, are symbol-mapped based on modulation schemes different one from another.

Due to this, the other radio station than the first and second radio stations is to receive part or all of the other symbol sequence differently modulated from the information symbol sequence, the signal correlation between the information symbol sequence and the other symbol sequence can be decreased to reduce the probability of demodulation of the information symbol sequence at the other radio station.

Meanwhile, a transmitter apparatus according to the invention is a transmitter apparatus wherein the plurality of symbol sequences, in part or all, are spread by code sequences different one from another.

Due to this, because of the structure easy to vary the code sequence, even where there should be such a propagation situation that the propagation channel has a high correlation characteristic to the propagation channel of between the first radio station and the other radio station, the code sequence for use in the information symbol sequence, if properly varied, enables control not to demodulate the information symbol sequence at the other radio station.

A radio communication method according to the invention comprises: a step of transmitting, from a communicating terminal to a base station having an array antenna having M elements, a reference signal made up by reference symbols known to the base station; a step for the base station to calculate a propagation parameter of between the communicating terminal and the base station from the received reference symbols in the number of M and produce a plurality of N dimensional vectors by using same; a step for the base station to multiply a plurality of symbol sequences containing a to-be-notified information symbol sequence, by the plurality of N dimensional vectors set such that at the communicating terminal the to-be-notified information symbol sequence only is to be received while other information symbol sequences are to be canceled, and to produce vector-multiplexed symbol sequences multiplexed and in the number of N; and a step of transmitting the vector-multiplexed symbol sequences from the base station to the communicating terminal.

Due to this, in a mobile communication system represented by cellular telephony or WLAN, the location, surrounding environment, etc. of the communicating terminal follows the change in time of propagation channel characteristic as caused by time change. Accordingly, the base station analyzes the propagation parameter featuring the propagation channel by use of the reference signal sent from the communicating terminal, and transmits a particular symbol sequence by use of the vector-multiplexed symbol sequence obtained by a vector-multiplexed process based on the analysis result of same. Accordingly, in the mobile communication system changing in propagation channel characteristic, the other radio station is difficult to restore the information symbol sequence. Thus, information leakage is prevented and communication security is ensured.

Meanwhile, a radio communication method of the invention comprises: a step of transmitting, from a base station having an array antenna having M elements to a communicating terminal, a reference signal made up by reference symbols known to the communication terminal; a step for the communicating terminal to produce a propagation channel information symbol sequence containing a propagation parameter of between the communicating terminal and the base station, from the received reference signal; a step of transmitting the propagation channel information symbol sequence from the communicating terminal to the communication terminal; a step for the base station to calculate the propagation parameter from the received propagation channel information symbol sequence and producing a plurality of N dimensional vectors by using an analysis result of same; a step for the base station to multiply a plurality of symbol sequences containing a to-be-notified information symbol sequence, by the plurality of N dimensional vectors set such that at the communicating terminal the to-be-notified information symbol sequence only is to be received while other information symbol sequences are to be canceled, and to produce vector-multiplexed symbol sequences multiplexed and in the number of N; and a step of transmitting the vector-multiplexed symbol sequences from the base station to the communicating terminal.

Due to this, the second radio station is allowed to feed the analysis result on the propagation parameter featuring the propagation channel back to the first radio station. Accordingly, where the propagation channel is asymmetric as to transmitting and receiving, e.g. in a radio communication system using frequencies different upon between transmitting and receiving, communication is possible with high security ensured.

According to the radio communication method of the invention so far described, a desired data sequence only is to be exchanged while securing a constant level of channel quality between particular radio stations. At the other radio station, or third party, a plurality of data sequences are to be simultaneously received with superimposition in addition to the desired data sequence. This can prevent the data sequence requiring concealment from being received by a third party on the communication channel, thus securing the high level of security over the radio communication channel.

Meanwhile, it is possible to transmit and receive a transmission data sequence, of from another radio station, to possibly cause interference over the radio channel established between particular radio stations, separately from the desired data sequence. Thus, interference tolerance can be improved for a radio communication system allowing a plurality of users to have accesses.

Meanwhile, in the invention, after estimating a multi-dimensional propagation parameter featuring the propagation channel of between the particular radio stations communicating, there is no need to carry out a processing of encryption, etc. using the propagation parameter. Thus, there is no need of signal processing amount increase or hardware high accuracy.

BRIEF DESCRIPTION OF THE DRAWINGS

FIG. 8 is a figure showing a frame structure of communication according to embodiment 1 of the invention.

BEST MODE FOR CARRYING OUT THE INVENTION

With reference to the drawings, embodiments of the present invention will now be explained in detail in the below.

(Embodiment 1)

Figure 1:
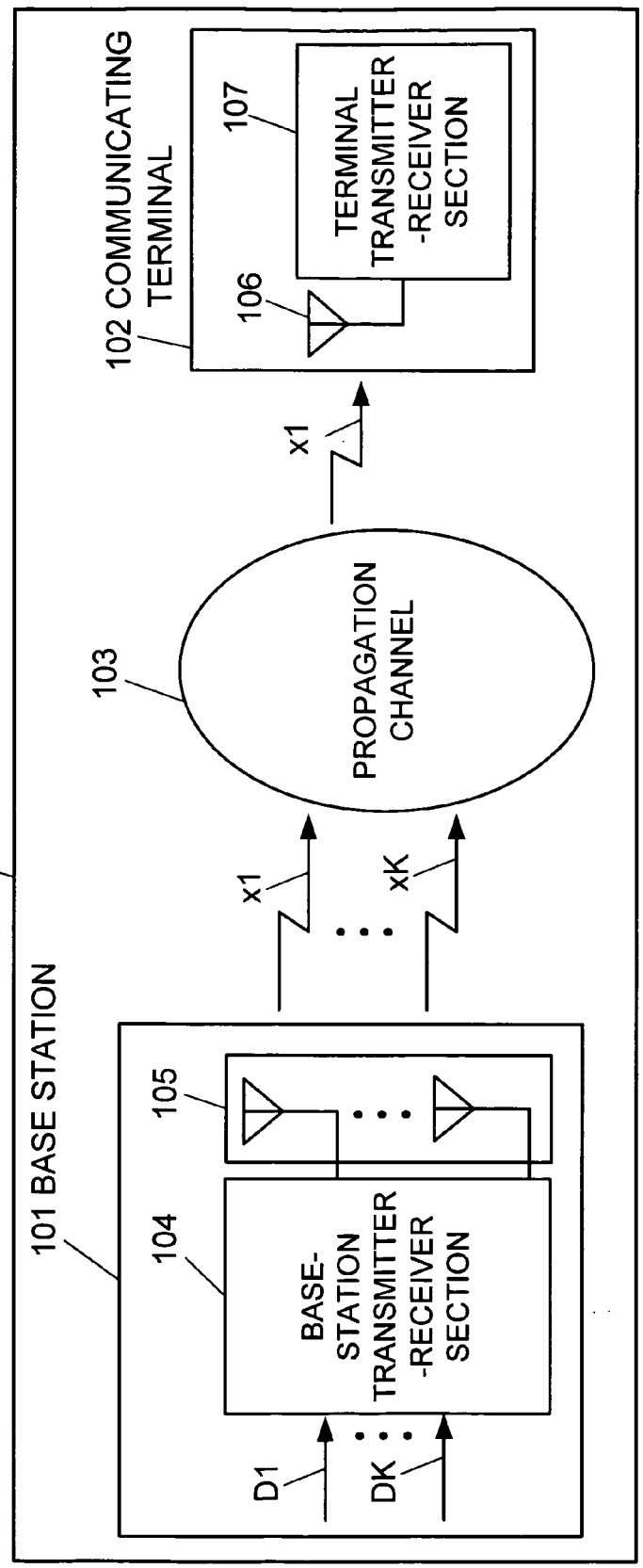
FIG. 1 is a block diagram showing an arrangement of a radio communication system according to embodiment 1 of the present invention.

FIG. 1 is a block diagram showing an overall arrangement of a radio communication system 100 of the invention. In the figure, the radio communication system 100 is configured with a base station 101, a communicating terminal 102, and a propagation channel 103 of between the base station 101 and the communicating terminal 102. The base station 101 has a base station transmitter-receiver section 104 and a base station array antenna 105 while the communicating terminal 102 has a terminal antenna 106 and a terminal transmitter-receiver section 107. The data sequences D1–DK in the number of K, to be transmitted from the base station 101, are sent in the form of vectorized signals x1–xK as to the data sequences D1–DK through the base station array antenna 105 to the communicating terminal 102.

Figure 2:
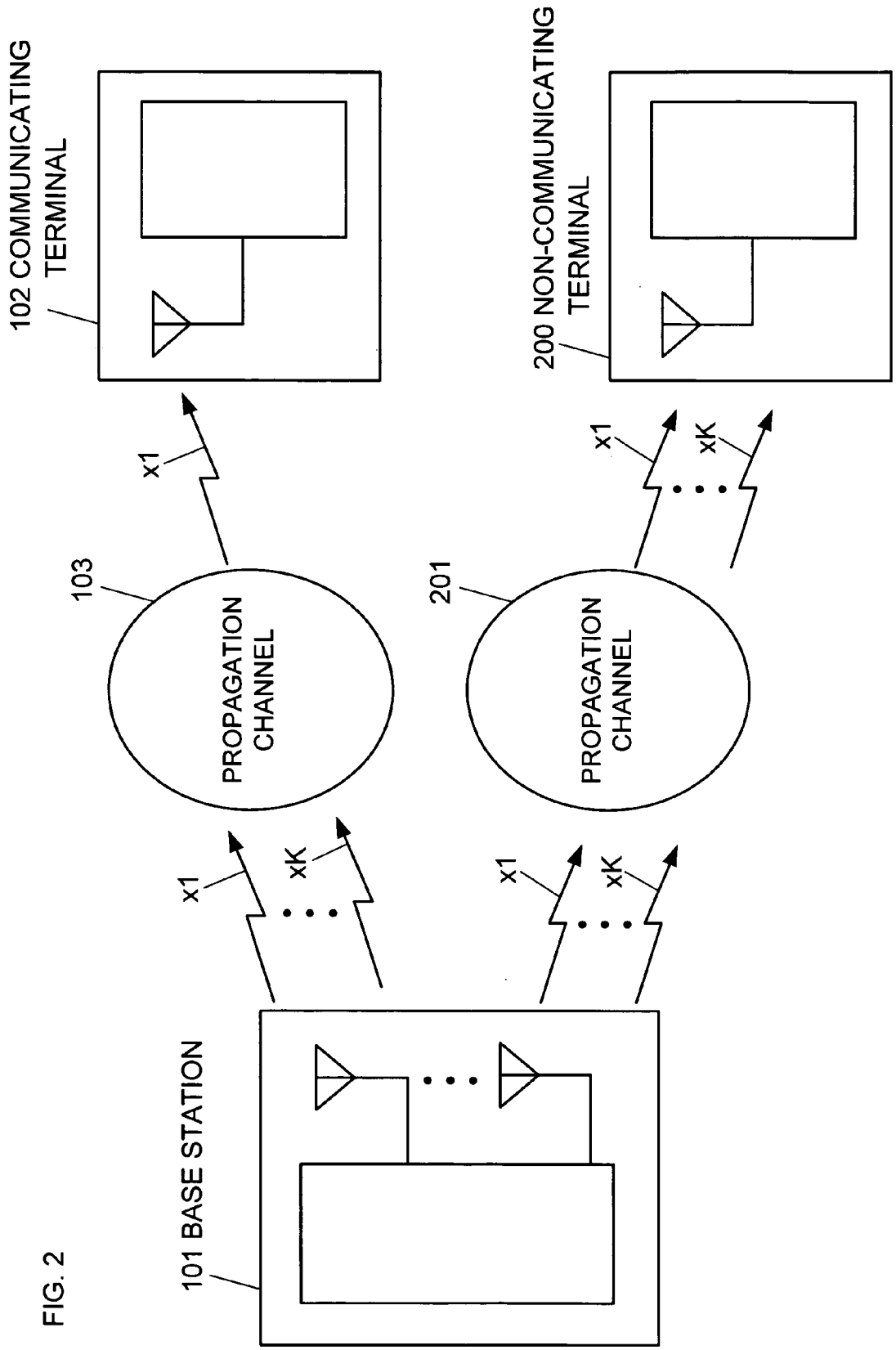
FIG. 2 is a concept diagram showing a feature of the radio communication system according to embodiment 1 of the invention.

FIG. 2 shows a system operation principle for realizing to ensure the security of transmission data on the radio communication system 100. In FIG. 2, the base station 101 is to transmit the vectorized signals x1–xK through the propagation channel 103 to the communicating terminal 102 whereas, to the non-communicating terminal 200, desirably the data from the base station 101 is prevented from leaking. This is in a location spatially different from the communicating terminal 102 with respect to the base station. Meanwhile, the propagation channel 201 is shown as a propagation channel lying between the base station 101 and the non-communicating terminal 200. In urban areas with densely packed buildings or in wall-surrounded indoor environment of radio wave propagation, the propagation channels to a plurality of communicating terminals, spatially different in location with respect to the base station, exhibit characteristics different one from another due to multi-path propagation. Particularly, it is known that the complex envelope fluctuations of received signals, taking place with movement of communicating terminals or with passage of time, have a probability distribution that can be modeled according to Rayleigh distribution. Between the different communicating terminals, there is no correlation as to the fluctuation characteristics of received signals.

In the radio communication system 100 of this embodiment, the base station 101 transmits, with vector multiplexing, the data sequences D1-DK simultaneously through the base station array antenna 105, in accordance with the propagation channel 103. It is now assumed that the transmit vector-multiplexed signal is transmitted to the communicating terminal 102 by way of the propagation channel 103. When control is done for the communicating terminal 102 to receive a vectrorized signal x1 of the data sequence D1 at high sensitivity, the non-communicating terminal 200 is caused to receive part or all of the vector signals x2–xK of the data sequences D2–DK simultaneously besides the vectorized signal x1 of the data sequence D1. This is because the propagation channel 201 exhibits a characteristic less correlated to the propagation channel 103. Due to the previous control for the communicating terminal 102 to have a higher correlation as to x1 to the propagation channel 103 while having a lower correlation of vectorized signals x2–xK to the propagation channel 103, control is effected to provide statistically a higher correlation of the vectorized signals x2–xK than the vectorized signal x1 to the propagation channel 201. Accordingly, when the base station is to convey the information of data sequence D1 to the communicating terminal 102, in case information is previously provided to the data sequences D2–DK differently from the data sequence D1, the non-communicating terminal 200 is made difficult to receive only the data sequence D1 and restore the information thereof.

With reference to FIGS. 3 to 11, explanation is made in detail below on the radio communication system 100 that the base station 101 is to transmit a plurality of data sequences by vector multiplexing to thereby prevent the information leak to the non-communicating terminal 200 and hence ensure the security of communication between the base station 101 and the communicating terminal 102 over the radio channel.

Figure 3:
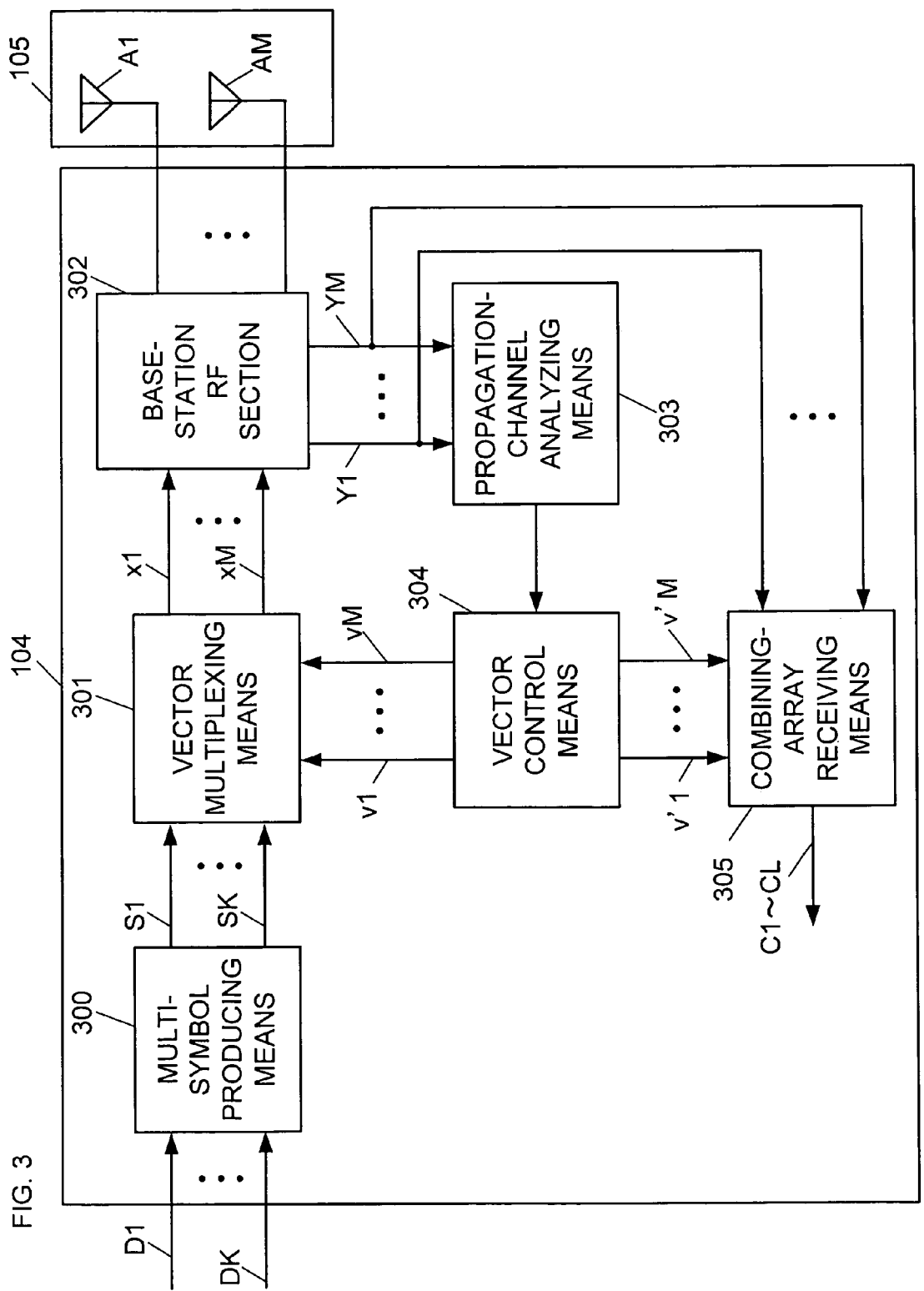
FIG. 3 is a block diagram showing a configuration of a base station according to embodiment 1 of the invention.

FIG. 3 shows a configuration of the base station transmitter-receiver section 104 and base station array antenna 105 in the base station 101. In the figure, the base station transmitter-receiver section 104 is configured with multi-symbol producing means 300, vector multiplexing means 301, base station RF section 302, propagation channel analyzing means 303, transmit-vector control means 304 and array-combined receiving means 305. Meanwhile, the base station array antenna 105 is structured with antenna elements A1–AM in the number of M.

Figure 4:
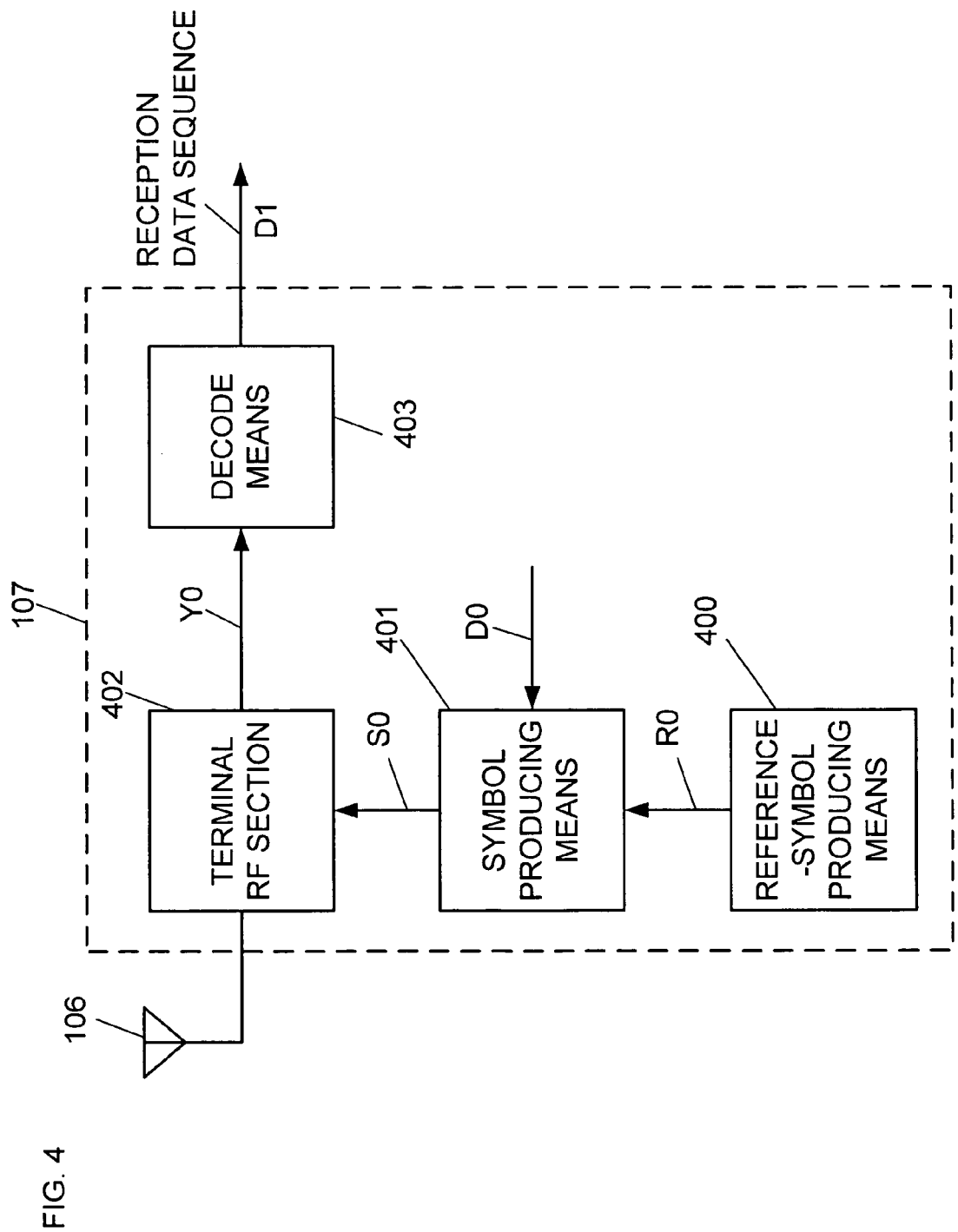
FIG. 4 is a block diagram showing the configuration of a communicating terminal according to embodiment 1 of the invention.

FIG. 4 shows a configuration of the terminal transmitter-receiver section 107 in the communicating terminal 102, 200. In FIG. 4, the terminal transmitter-receiver section 107 is configured with reference-symbol producing means 400, symbol producing means 401, a terminal RF section 402 and decode means 403.

In this embodiment, the communicating terminal 102 transmits a reference signal x0 at the terminal antenna 106. The reference signal x0 is to be received by the base station 101 in order to analyze the propagation channel 103. This contains a reference signal previously shared between the base station 101 and the communicating terminal 102.

In the outset, the transmit operation at the communicating terminal 102 is explained below by use of FIG. 4.

In FIG. 4, the reference-symbol producing means 400 produces a particular reference symbol R0 previously agreed between the base station 101 and the communicating terminal 102, and forwards it to the symbol producing section 401. The symbol producing means 401 makes up a transmission frame 500 by the received reference symbol R0 and, if required, by a pilot symbol P0, address symbol A0 and frame check symbol FC0 added to the data sequence D0 symbol-mapped in accordance with modulation scheme, thereby outputting it as a symbol sequence S0 to the terminal RF section 402. The terminal RF section 402 converts the symbol sequence S0 into a radio band signal and transmits it as a reference signal x0 to the base station 101 through the terminal antenna 106.

Figure 5:
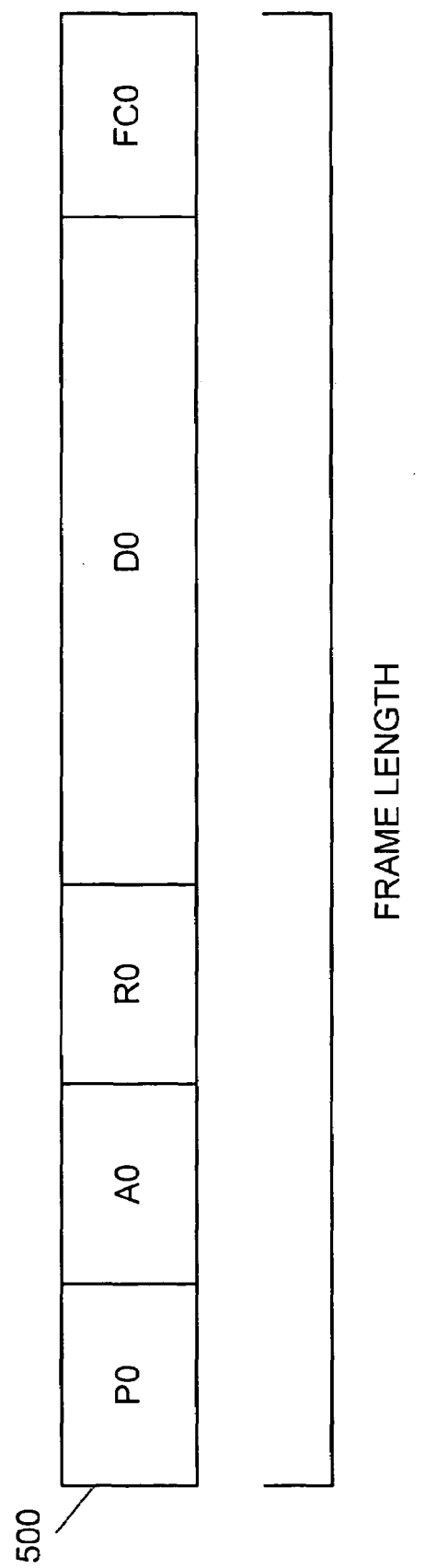
FIG. 5 is a figure showing a transmission frame structure of a reference symbol according to embodiment 1 of the invention.

In FIG. 5, note that, for receiving, the reference symbol R0 is used as a reference symbol, the pilot symbol P0 as frame synchronization establishment, the address symbol A0 as terminal authentication and the frame check symbol FC0 for use in bit-error detection upon of receiving. Meanwhile, the symbol-mapped data sequence D0 is inserted, as required, upon transmission. However, where the symbol sequence is used for the mere purpose of analyzing the propagation channel 103, it may be structured to transmit the reference symbol R0 only. Meanwhile, where the base station 101 is to estimate an arrival wave direction or polarization from the received signals at the antenna elements A1–AM of the base station array antenna 105 and to calculate for the propagation channel 103 depending upon the result thereof, there is not always a need to transmit a reference symbol R0 from the communicating terminal 102.

Now, the receive operation at the base station 101 is explained below by use of FIG. 3.

In FIG. 3, the reference signal x0, sent from the terminal antenna 106, is received by the base station array antenna 105 by way of the propagation channel 103. The received signals at the antenna elements A1–AM of the base station array antenna 105, are respectively converted into received symbol sequences Y1–YM as baseband signals in the base station RF section 302, and outputted to the propagation channel analyzing means 303. The propagation channel analyzing means 303 takes as an input the received symbol sequences Y1–YM, to produce a propagation channel matrix H as a propagation parameter featuring the propagation channel 103. The elements constituting the propagation channel matrix H are complex channel coefficients h1–hM calculated from the amplitude and phase of a reference symbol R0 component contained in the received symbol sequences Y1–YM. Hence, the propagation channel matrix H is to be expressed as in (Equation 1).

$$H=[h1\ h2\ \ldots\ hM] \tag{1}$$

Incidentally, how to calculate a propagation channel matrix H here was explained with the method using a reference symbol R0, or known signal. Alternatively, it is possible to estimate any or all of the frequency, delay time, incident direction and polarization of an arrival wave depending upon the received signals at the antenna elements A1–AM of the base station array antenna 105, and to estimate a propagation channel matrix H depending upon the result thereof.

Then, the vector control means 304 makes a singular-value or eigen-value decomposition of the propagation channel matrix H by use of the propagation channel matrix H as an input, and produces a transmitting vector space V and a receiving vector space V'. It is assumed here that the vector space V determined from H is formed by a matrix space comprising column vectors having K (K<=M) rows and in the number of M (M dimensions) as shown in (Equation 2) while the vector space V' is a matrix space comprising column vectors having L (L<=M) rows and in the number of M (M dimensions) as shown in (Equation 3).

$$\begin{bmatrix} V_1 \\ V_2 \\ \vdots \\ V_K \end{bmatrix} = \begin{bmatrix} V_{11} & V_{21} & \ldots & V_{M1} \\ V_{12} & V_{22} & \ldots & V_{M2} \\ \vdots & \vdots & \ldots & \vdots \\ V_{1K} & V_{2K} & \ldots & V_{MK} \end{bmatrix}^T \quad (2)$$

$$\begin{bmatrix} V'_1 \\ V'_2 \\ \vdots \\ V'_L \end{bmatrix} = \begin{bmatrix} V'_{11} & V'_{21} & \ldots & V'_{M1} \\ V'_{12} & V'_{22} & \ldots & V'_{M2} \\ \vdots & \vdots & \ldots & \vdots \\ V'_{1L} & V'_{2L} & \ldots & V'_{ML} \end{bmatrix}^T \quad (3)$$

Note that T represents a transposition action to the matrix.

Now explanation is made on the procedure for calculating a vector space V. First explained is a calculation procedure based on singular-value decomposition.

(Equation 4) shows singular-value decomposition of a propagation channel matrix H shown in (Equation 1).

$$H = U \cdot \Delta \cdot Vs^H \quad (4)$$

Note that, concerning the right side of (Equation 4), $\Delta$ is a matrix with one row and M columns, having a singular value of H as a matrix element. Meanwhile, Vs is a vector space constituted by mutually orthogonal column vectors vs1–vsM having M rows (M dimensions) and in the number of M. Those can be expressed as (Equation 5) to (7), respectively.

Meanwhile, $Vs^H$ shows a matrix assuming a complex conjugate transposition to the matrix Vs. Furthermore, because H is a matrix with one row and M columns, singular value is to be sought only one in the number, which here is assumed as $\delta$.

$$U = 1 \quad (5)$$

$$\Delta = [\delta\ 0\ \ldots\ 0]^T \quad (6)$$

$$Vs = [vs1\ vs2\ \ldots\ vsM] \quad (7)$$

Now explained is a case of using eigen-value decomposition. The vector control means 304 calculates first a correlation matrix R on the propagation channel matrix H of (Equation 1) by using (Equation 8).

$$R = H^* \cdot H \quad (8)$$

Note that * represents the action of a complex conjugate transposition to the matrix. As shown in (Equation 9), the correlation matrix R is decomposed by eigen values and eigen vectors to calculate a square matrix $\lambda$ with M rows and M columns having a diagonal term of eigen values, and a vector space Ve.

$$R \cdot Ve = \lambda \cdot Ve \quad (9)$$

Here, Ve is a vector space constituted by mutually orthogonal column vectors ve1–veM with M rows (M dimension) and in the number of M, wherein k is a matrix with M rows and M columns having a diagonal term of squared values of the elements of the foregoing $\Delta$ and the other element all assuming 0.

Furthermore, the vector control means 304 selects column vectors in the number of K out of the column vectors in the number of M constituting Vs obtained by singular-value decomposition or Ve obtained by eigen-value decomposition, and outputs those as a transmitting vector space V. Also, it selects column vectors in the number L and outputs those as a receiving vector space V'.

Next, explanation is made on the transmit operation of data sequences D1–DK at the base station 101.

Figure 6:
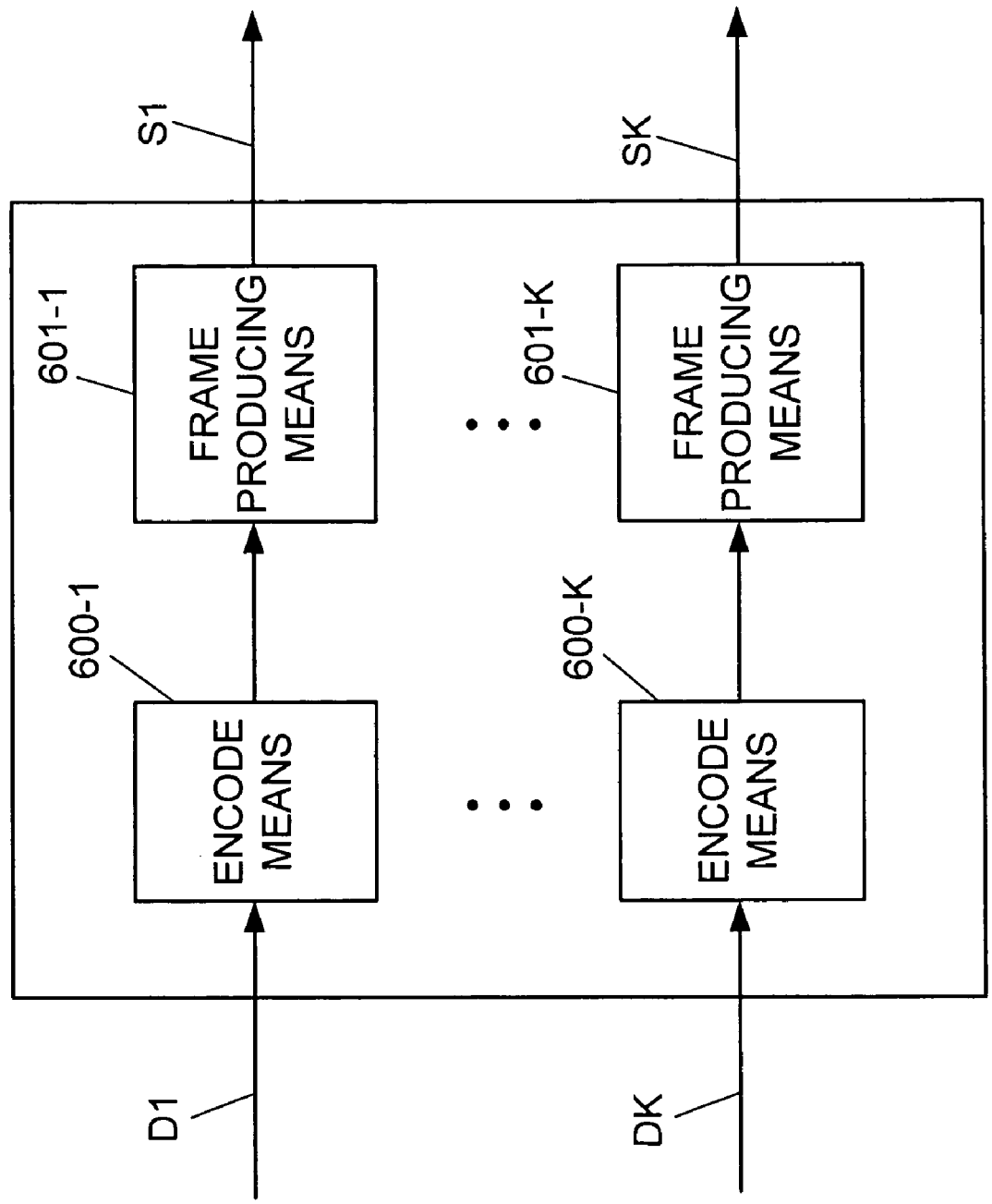
FIG. 6 is a block diagram showing a configuration of multi-symbol producing means according to embodiment 1 of the invention.
Figure 7:
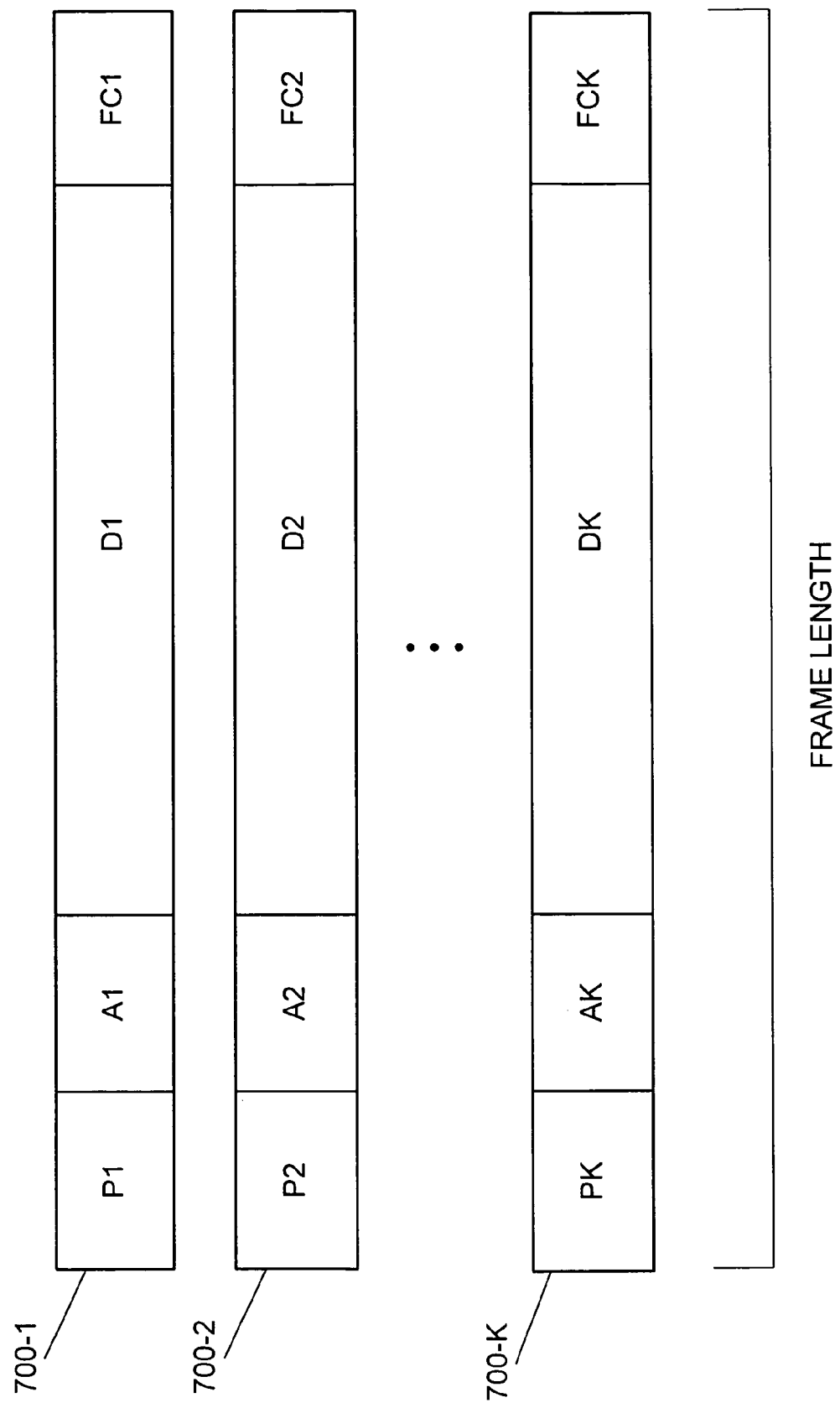
FIG. 7 is a figure showing a frame structure of communication according to embodiment 1 of the invention.

As shown in FIG. 6, the multi-symbol producing means 300 of the base station transmitter-receiver section 104 is configured with encode means 600-1–600-K in the number of K and frame producing means 601-1–601-K. At first, the encode means 600-1–600-K uses the data sequences D1–DK as an input and executes a symbol-mapping process over a complex plane in accordance with modulation scheme. Furthermore, the frame producing means 601-1–601-K adds the symbol-mapped data sequences D1–DK with pilot symbols P1–PK for frame synchronization, address symbols A1–AK for information source identification and frame check symbols FC1–FCK for bit error detection upon reception, to thereby produce transmission frames 700-1–700-K and output those to the vector multiplexing means.

The vector multiplexing means 301 uses, as an input, the symbol sequences S1–SK comprising the transmission frames 700-1–700-K and executes a vector multiplexing process as shown in (Equation 10) by use of the vector space V constituted by the vectors v1–vK produced by the vector control means 304, thus producing vector-multiplexed symbol sequences X1–XM.

$$[X1\ X2\ \ldots\ XM]^T = [S1\ S2\ \ldots\ SK] \cdot V \quad (10)$$

The vector-multiplexed symbol sequences X1–XM are constituted with vector-multiplexed transmission frames 800-1–800-M in the number of M as shown in FIG. 8. Those are to be transmitted correspondingly to the antenna elements A1–AM structuring the base station array antenna 105.

The base station RF section 302 converts the vector-multiplexed symbol sequences X1–XM respectively into radio-frequency-band signals. The converted signals are transmitted to the communicating terminal 102 through the antenna elements A1–AM structuring the base station array antenna 105.

Now explanation is made below on the receive operation at the communicating terminal 102 using FIG. 4.

At first, in the terminal transmitter-receiver section 107 of the communicating terminal 102, the terminal RF section 402 converts the received signal at the terminal antenna 106 into a received symbol sequence Y0, or baseband signal, and outputs it to the decode means 403. The decode means 403, received a transmission frame 700-1, uses as an input the received symbol sequence Y0 and executes frame synchronization, information source authentication, demodulation of the data sequence D1 based on modulation scheme and frame error check process, thereby restoring the data sequence D1 and outputting it as a received data sequence.

Here, provided that the received symbol sequence as a received signal at the non-communicating terminal 200 is Y1 and the propagation channel matrix as a featuring of between the base station 101 and the non-communicating terminal 200 is Hl, the received symbol sequences Y0 and Y1 as received signals at the communicating terminal 102 are respectively expressed by equations as in the following:

$$Y0 = H \cdot X + N0 \quad (11)$$

$$Y1 = H1 \cdot X + N1 \quad (12)$$

Here, X is a vector denotation of the vector-multiplexed symbol sequences X1–XM and denoted by use of (Equation 10) as in the following.

$$X = [S1\ S2\ ...\ SK] \cdot V \qquad (13)$$
$$= [S1 \cdot v1\ S2 \cdot v2\ ...\ SK \cdot vK]$$

Meanwhile, N0 and N1 respectively represent noised components contained in the received symbol sequences Y0 and Y1. Accordingly, Y0 can be changed to the following equation, from (Equation 11) and (Equation 13).

$$Y0 = H \cdot (v1 \cdot s1 + v2 \cdot S2 + ... + vK \cdot SK) + N0 \qquad (14)$$

Meanwhile, the propagation channel matrix H, because to be decomposed by singular values and orthogonal matrixes as in (Equation 4), is expressed according to the characteristic shown in (Equation 5), (6) and (7), as in the following.

$$H \cdot vk = \delta,\ k=1=0,\ k \neq 1 \qquad (15)$$

Furthermore, if considering in (Equation 14) the condition of (Equation 15), Y0 is expressed as in the following.

$$Y0 = \delta \cdot S1 + N0 \qquad (16)$$

Here, provided that the mean power of a noise component N0 is Pn0 and received SINR at the communicating terminal 102 is SINR0, SINR0 can be expressed by the following equation.

$$SINR0 = (\delta \cdot S1)^2 / Pn0 \qquad (17)$$

This shows that SINR0 can be set at a proper value by control of transmit power to S1, i.e. norm of v1.

Likewise, using (Equation 12) and (Equation 13), Y1 is given by the following equation.

$$Y1 = H1 \cdot (v1 \cdot S1 + v2 \cdot S2 + ... + vK \cdot SK) + N1 \qquad (18)$$

Meanwhile, when the product of the propagation channel matrix H1 and the vectors v1–vK is given γ k, the following relationship is held.

$$H1 \cdot vK = \gamma k \qquad (19)$$

Furthermore, from (Equation 18) and (Equation 19), Y1 is expressed by the following equation.

$$Y1 = \gamma 1 \cdot S1 + \gamma 2 \cdot S2 + ... \gamma K \cdot SK + N1 \qquad (20)$$

Here, it is assumed that the mean power of noise component N1 is given Pn1 and the received signal power of symbol sequence S1 is a desired signal component at the non-communicating terminal 200.

In this case, provided that the received SINR at the non-communicating terminal 200 is SINR1, SINR1 is expressed by the following equation.

$$SINR1 = (\gamma 1 \cdot S1)^2 / \{(\gamma 2 \cdot S2)^2 + ... (\gamma K \cdot SK)^2 + Pn1\} \qquad (21)$$

It is generally known that, in mobile communication environment, where terminal-to-terminal distance is as far as a carrier frequency wavelength, propagation channel is approximated to non-correlation. Particularly, in the system of cellular telephony, wireless LAN or the like utilizing a microwave band wherein carrier frequency wavelength is as small as dozens of centimeters or smaller, the propagation channels observed between terminals can be approximated as non-correlated. For example, assuming such a propagation environment of mobile communication, the vectors v2–vK orthogonal to the propagation channel matrix H in this embodiment could have correlations to the propagation channel matrix H1. Namely, because γ2–γK become not zero, the following is held from a statistic viewpoint.

$$SINR0 > SINR1$$

Accordingly, because of (transmission error rate at the communicating terminal 102)<(transmission error rate at the non-communicating terminal 200), there is a reduced probability for the non-communicating terminal 200 to demodulate the symbol sequence S1 freely from errors and restore the data sequence D1, as compared to the communicating terminal 102.

The explanation made so far was on the case that the vector control means 304 calculated a vector space V or V' obtainable by singular-value or eigen-value decomposition of the propagation channel matrix H having M rows and M columns. This however is a mere one example for obtaining such v2–vM as having low correlation to the column vector v1 constituting a vector space V. Namely, the vector control means 304 satisfactorily calculates such a vector space V that column vectors v2–vM are linearly independent of the column vector v1 rather than the propagation channel matrix H or such a vector space that column vectors v2–vM are orthogonal to the column vector v1. Thus, there is no limitation in the method of calculating the same.

Explanation is now made on the case of using BPSK as a modulation scheme on the data sequences D1–DK, as an analysis example of demodulation characteristic in the communicating terminal 102 and non-communicating terminal 200, by use of FIG. 9.

Figure 9A:
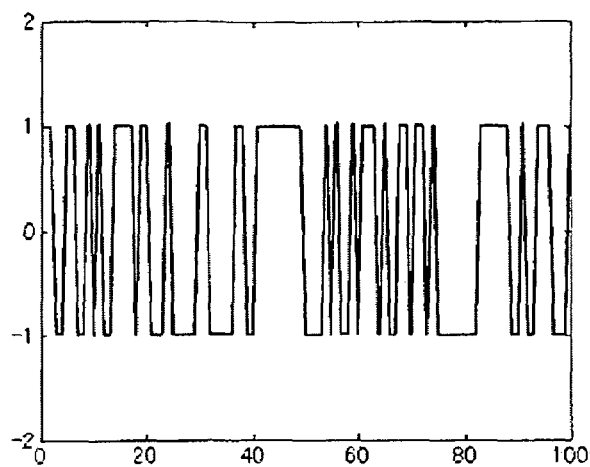
FIGS. 9A to 9C are figures showing a received signal waveform according to embodiment 1 of the invention.
Figure 9B:
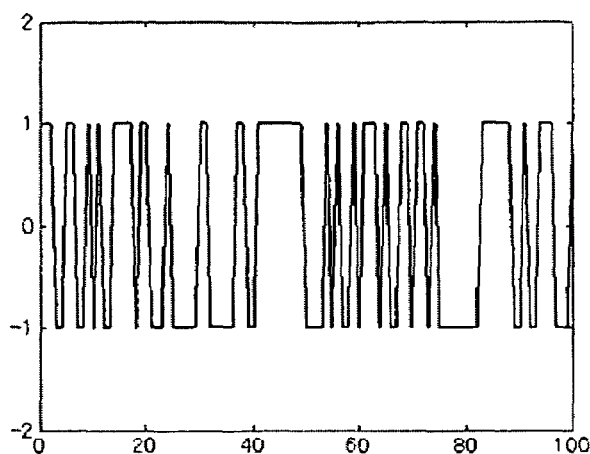
Figure 9C:
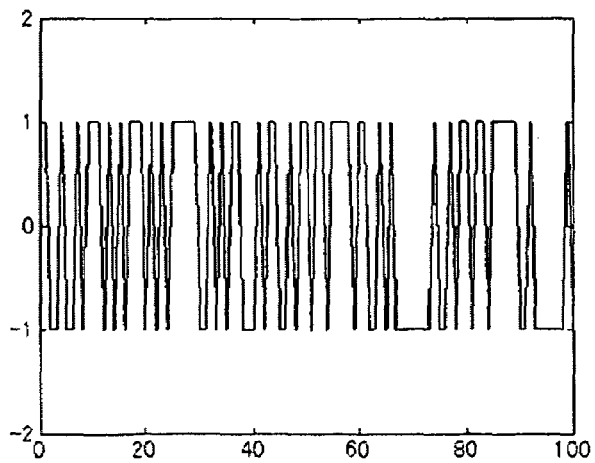

FIGS. 9a to (c) show a simulation analysis result in the presence of the base station 100, and communicating terminal 102 and the non-communicating terminal 200.

FIG. 9a is a signal waveform of a data sequence D1 produced at the base station 101, FIG. 9b is a signal waveform of a received data sequence obtained as a result of demodulation at the communicating terminal 102, and FIG. 9c is a signal waveform of a received data sequence obtained as a result of demodulation at the non-communicating terminal 200. The simulation is under the condition that the number of antenna elements M constituting the base station array antenna 105 is 8, the data sequence D1 has data in the number of 100, and the data sequences to be transmitted with vector multiplexing from the base station 101 are in the number of 8equal to the number of antennas. Meanwhile, the elements h1–h8 of a propagation channel matrix H are produced by use of (Equation 22), according to the Rayleigh probability distribution.

$$hm = N(0, \tfrac{1}{2}) + j^* N(0, \tfrac{1}{2}),\ m=1\ ...,\ 8 \qquad (22)$$

Note that N(0, ½) is a function to produce random numbers according to a normal probability distribution having a mean of 0 and a standard deviation of ½.

As noted before, at the base station 101, the vector multiplexing means 301 transmits, with vector multiplexing, the symbol sequences S1–S8 for data sequences D1–D8 by use of vectors v1–v8. The vectors v1–v8 are calculated from a propagation channel matrix H describing of a characteristic of the propagation channel 103 of between the base station 101 and the communicating terminal 102, having a feature orthogonal one to another wherein the vector v1 only has a high correlation to the propagation channel matrix H. Accordingly, as shown in FIG. 9b, the data sequence D1, vectorized based on the vector v1, is to be demodulated correctly at the communicating terminal 102.

Meanwhile, the propagation channel 201, of between the non-communicating terminal 200 and the base station 101, has a correlation also to the vectors v2–v8, allowing for reception of symbol sequences S2–SK simultaneously with the symbol sequence S1 for the data sequence D1. Accordingly, because of a difficulty in detecting and correctly restoring the data sequence D1 at the non-communicating terminal 200 as shown in FIG. 9c, the data sequence D1 for transmission to the communicating terminal 102 can be prevented from leaking to the non-communicating terminal 200.

Figure 10:
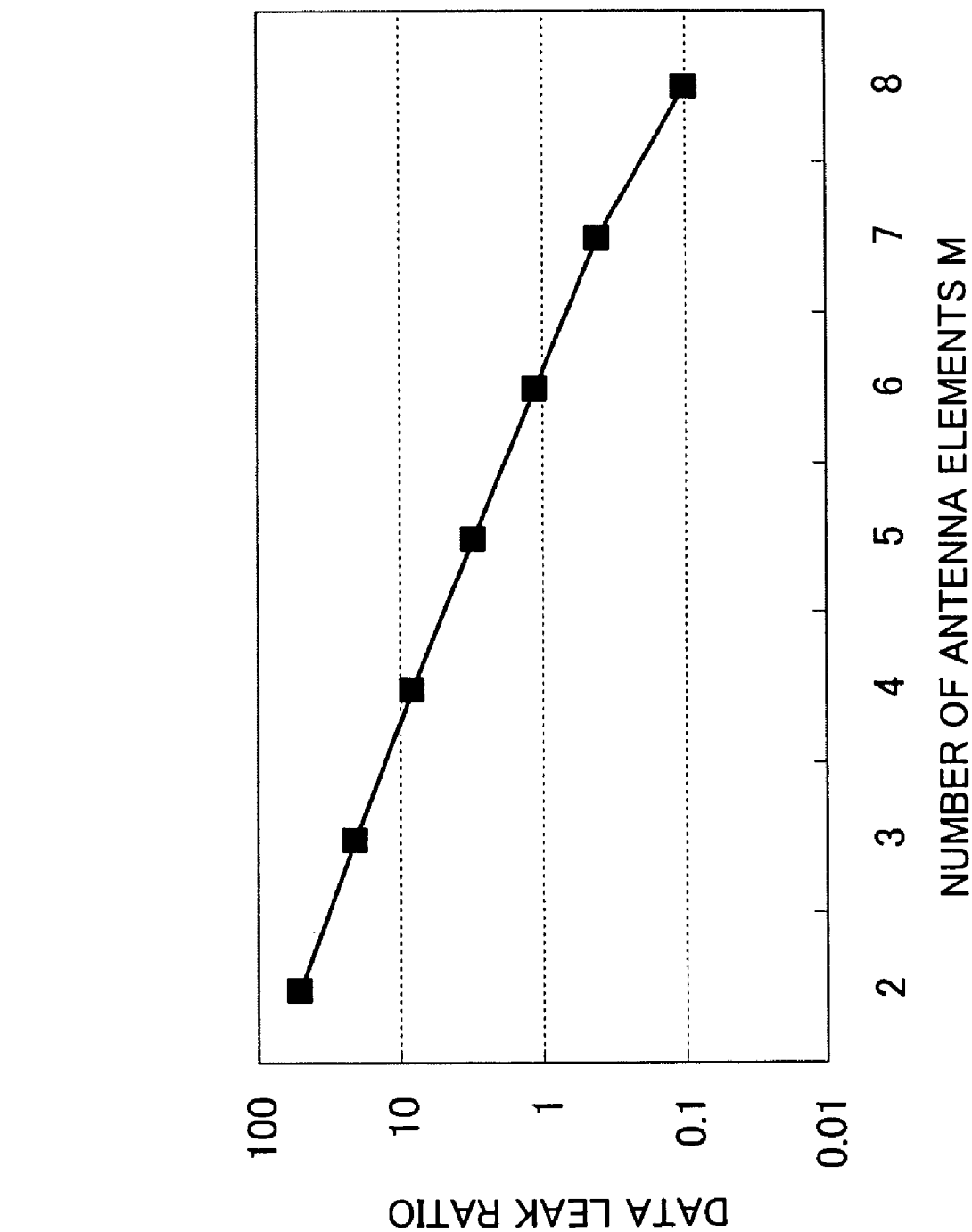
FIG. 10 is a figure showing a leak ratio of communication data according to embodiment 1 of the invention.

Using FIG. 10, explanation is now made on the result of a simulation of statistic evaluation as to the leak ratio of the data sequence D1 to the non-communicating terminal 200. The propagation channel matrix H is produced by use of (Equation 22) based on the Rayleigh probability distribution, similarly to the case of FIG. 9. FIG. 10 shows the number of antenna elements M of the base station array antenna 105 on the abscissa and a leak ratio of data on the ordinate. The leak ratio Z here is agreed according to (Equation 23) by using the number of times L that data leak is to be considered when the propagation channel matrix H to propagation channel 201 is updated N times. Assumption is made here that, at the non-communicating terminal 200, there is considered a data leak in the case that the data sequence D1 having data in the number of 128 has been demodulated without encountering errors.

$$Z=(L/N)\times 100\ [\%] \quad (23)$$

However, the leak ratio as agreed by (Equation 23) is assumably calculated under the condition that, at the base station 101, the number of data sequences K to be transmitted with vector multiplexing is equal to the number of antenna elements M, i.e. K=M.

As shown in FIG. 10, the leak ratio Z of data decreases with increase in the number of antenna elements M. At M=8, i.e. when the base station array antenna 105 has the number of antenna elements of 8, the data leak ratio is secured at 0.1%. Namely, by employing the arrangement of radio communication system 100 of this embodiment, the concealment of communication data can be enhanced without carrying out the encryption process to the communication data.

Meanwhile, where the radio communication system 100 is utilized on a mobile communication system such as of cellular telephony or WLAN, the propagation channel 103 has a characteristic fluctuates in time with movement of the communicating terminal. In case the communication data to the communicating terminal 102 should be received for a given time in a location where a non-communicating terminal 200 exists, there is an extreme difficulty in continuously receiving the communication data.

Incidentally, at the base station 101, the encode means 600-1–600-K executed the symbol-mapping process on the data sequences D1–DK by use of the same modulation scheme. Alternatively, symbol-mapping process may be executed on the data sequences D1–DK by using different modulation schemes, to produce a plurality of symbol sequences S1–SK different in symbol information. Besides, by making the encode means 600-1–600-K execute a code spreading process on the data sequences D1–DK with use of different code sequences, a plurality of symbol sequences S1–SK may be produced that are different in symbol information.

In this manner, in the case of producing symbol sequences S1–SK by using different modulation schemes or spread codes, demodulation process is enabled at the communicating terminal 102 by estimating a modulation scheme or spread codes from a received symbol sequence Y0 by means of the demodulating means 403 at the communicating terminal 102 or previously sharing the modulation scheme or spread codes. Meanwhile, by allowing the demodulating means 403 to estimate a modulation scheme or a spread code, the base station 101 may change the modulation scheme or spread codes with passage of time. This can reduce the data leak ratio to the non-communicating terminal 200 without increasing the number of antenna elements M of the base station array antenna 105.

Incidentally, the process that the base station 101 received the data sequence D0 sent from the communicating terminal 102 is as per the following.

Namely, the array-combined receiving means 305 uses, as an input, the received symbol sequences Y1–YM and the vector space V' calculated in the vector control means 304, and makes a weight-combining process of the vector space V' on the received symbol sequences Y1–YM by use of (Equation 24), thus obtaining vector-combined signals C1–CL. Here, it is assumed that the foregoing column vectors Vs or Ve are selected and used for the vector space V'.

$$[C1\ C2\ \ldots\ CL]=[Y1\ Y2\ \ldots\ YM]\cdot V' \quad (24)$$

The vector-combined signal C1 obtained by (Equation 24) is a received signal obtained by combining the reference signal x0 sent from the communicating terminal 102 with a directivity of the base station array antenna 105. Meanwhile, there is a possibility that the vector-combined signals C2–CM contain an interference signal component of from the non-communicating terminal 200. Thus, it is possible to estimate a desired-signal-power to interference-signal-power ratio from the signal power of the vector-combined signal C1 and the vector-combined signals C2–CM. Furthermore, the array-combined receiving means 305 executes frame synchronization, terminal authentication, demodulation of the data sequence D0 based on modulation scheme and frame error check process, thus restoring the data sequence D0 and outputting it as a received data sequence.

Meanwhile, a receiving process using an MMSE (Minimum Mean Square Error) method [1] is possible to carry out in place of using, as a vector space V' for use upon receiving, Vs or Ve obtained by singular-value decomposition or eigen-value decomposition of H as in the foregoing.

[1] B. Widrow, P. E. Mantey, L. J. Griffiths, and B. B. Goode, "Adaptive Antenna Systems", Proc. IEEE, vol. 55, no. 12, pp. 2143–2158, December 1967.

In this case, the propagation channel analyzing means 303 uses, as an input, the received symbol sequences Y1–YM and produces a correlation vector r of between complex conjugate value R0' to reference symbol R0, or reference signal, and Y1–Ym according to (Equation 25). A correlation matrix R to propagation channel matrix H is determined by (Equation 8) and outputted to the vector control means 304.

$$r=[Y1\ Y2\ \ldots\ YM]^T \times R0' \quad (25)$$

Thereupon, the vector control means 304 uses the correlation vector r and correlation matrix R, and calculates a vector v1 by use of (Equation 26). The value is to be updated by using the steepest descent method, etc.

$$vr=R^{-1}\cdot r \quad (26)$$

Note that $R^{-1}$ represents an inverse matrix to R. In this case, the array-combined receiving means 305 uses, as an input, the received symbol sequences Y1–YM and the vector vr, and produces a vector-combined signal C1 by a weight-combining process of vr to the Y1–YM through use of (Equation 27).

$$C1 = [Y1\ Y2\ \ldots\ YM] \cdot vr \quad (27)$$

Then, for the vector-combined signal C1, executed are frame synchronization, terminal authentication, demodulation of the data sequence D0 based on modulation scheme and frame error check process, thereby restoring the data sequence D0 and outputting it as a received data sequence.

Figure 11:
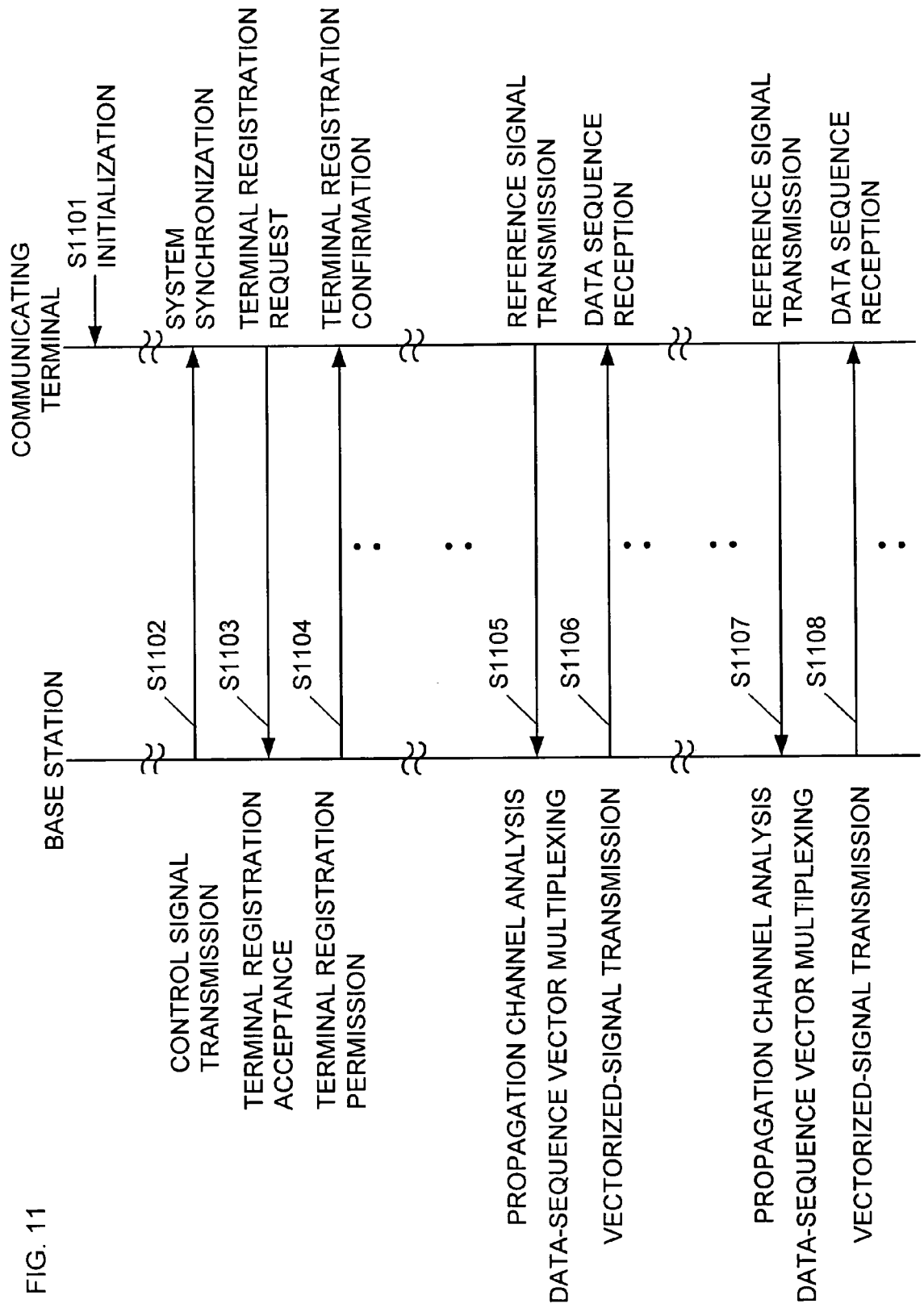
FIG. 11 is a figure showing a procedure of communication according to embodiment 1 of the invention.

Using FIG. 11, explanation is made on the flow of from an establishment of radio-circuit synchronization to a completion of data transmission, in a radio communication system 100 having the base station 101 and communicating terminal 102 arranged as above for operation, from a viewpoint of communication procedure.

Process 0: Initialization of the Base Station 101 and Communicating Terminal 102

The base station 101 and the communicating terminal 102 are both set in an initial state immediately after turning on the power or by receiving a particular signal. Simultaneously, the states of frequency, time, synchronization, etc. are established according to a procedure agreed beforehand (step After a given time from the completion of these initial operations, the base station 101 puts control information on a control signal and transmits it at a constant time interval (step S1102).

Meanwhile, the communicating terminal 102, after completing the initial operation (step S1101), begins to search for a control signal. When the communicating terminal receives the control signal sent from the base station, the communicating terminal 102 detects its time, frequency, etc. and synchronizes those with the time and frequency held on the system (hereinafter, this is referred to as "system synchronization) (step S1102). After system synchronization is normally completed, the communicating terminal 102 transmits a registration request signal to the base station in order to notify the presence thereof (step S1103). The base station 101 transmits a registration allowance signal responsive to the registration request from the communicating terminal 102, thereby giving registration allowance to the terminal (step S1104).

Process 1: Reference Symbol Transmission by the Communicating Terminal 102

The communicating terminal 102 outputs a reference signal X0 containing a reference symbol R0 for the base station 101 to analyze the propagation channel 103 (step S1105). Specifically, the reference-symbol producing means 400 of the communicating 102 produces a previously agreed particular reference symbol R0 and makes up a transmission frame F0, thus outputting it as a symbol sequence S0. The terminal RF section 402 converts the symbol sequence S0 into a radio-frequency-band signal and transmits it as a reference signal x0 through the terminal antenna 106 (step S1105).

The base station 101 waits for a reference signal x0 received at the base station array antenna 105 through the propagation channel 103 from the communicating terminal 102 (step S1105). The received signals at the antenna elements A1–AM, in the base station RF section 302, are respectively converted into received symbol sequences Y1–YM, or baseband signals. The propagation channel analyzing means 303 uses the received symbol sequences Y1–YM as an input and produces a propagation channel matrix H as a parameter featuring the propagation channel 103. Then, the vector control means 304 calculates a vector space V as to H and produces column vectors v1–vK constituting the vector space V.

Process 2: Vectorized Signal Transmission by the Base Station 101

The base station 101 transmits vectorized signal x1–xK to the communicating terminal 102 by use of the base station array antenna 105 (step S1106). Specifically, taking the data sequences D1–DK as an input, the multi-symbol producing means 300 executes a symbol-mapping process over a complex plane according to modulation scheme, and makes up transmission frames 700-1–700-K, thus outputting those as symbol sequences S1–SK. The vector multiplexing means 301 uses the symbol sequences S1–SK as an input, and executes a vector multiplex process using vectors v1–vK and produces vector-multiplexed symbol sequences X1–XM. The vector-multiplexed symbol sequences X1–XM are sent with correspondence thereof to the antenna elements A1–AM structuring the base station array antenna 105. The base station RF section 302 converts the vector-multiplexed symbol sequences X1–XM respectively into radio-frequency-band signals and transmits those as vectorized signals x1–xK through the base station array antenna 105.

From then on, vector-multiplexed communication of process 2 and usual communication are repeatedly done.

Explanation was made so far on process 0 as the initialization operation. This however is assumed on the general operation, and hence is not a requisite proceeding for the invention.

Meanwhile, in process 1, the propagation channel was analyzed by sending the reference signal. This is because the propagation parameter generally can be estimated higher in accuracy rather by use of a known signal, i.e. propagation channel analysis can be done even unless using especially a reference signal. In other words, propagation parameters can be estimated by utilization, for example, of a control signal as in process 0, a registration request signal, a registration permission signal or the like.

Incidentally, because the invention is characterized in that a plurality of data sequences are transmitted with vector multiplexing through utilization of the characteristic of the propagation channel 103 of between the particular communicating terminal 102 and the base station 101, there are possible cases to raise a problem where there are movement occurrences of the base station or the communicating terminal. However, in this case, the problem can be avoided by repeatedly transmitting and receiving the reference signal after movement, as in steps S1107 and S1108 shown in FIG. 11.

As described above, in the radio communication method of the invention, by controlling a propagation channel SINR decisive for the error ratio of a radio transmission channel, third party's received SINR is degraded while securing a certain level or more of received SINR at between particular radio stations for mutual data transmissions simultaneously. By raising the error occurrence probability of the signal sequence for the third party to demodulate, the data requiring concealment can be prevented from leaking to the third party through a radio communication channel.

Meanwhile, in the transmitter apparatus of the invention, although the propagation channel matrix H if deteriorated in estimation accuracy causes a deterioration of SINR to the communicating terminal but does not change the probabilistic distribution characteristic of SINR to the non-communicating terminal. Namely, where assured is the condition that the SINR to the communicating terminal 102 is at or higher than receiving sensitivity, there is no increase of data leak ratio. Accordingly, as compared to the point that the prior art concerning encryption key generation based on propagation parameters relies directly upon the estimation accuracy of propagation parameter, the transmitter apparatus of the invention can prevent against data leak on the communication physical layer in a state securing the robustness of data transmission, in the radio-wave propagation environment being complex and always varying in time as in a mobile communication environment, thus resultingly providing high level of security.

Furthermore, those processes can be implemented independently of the encryption and decryption using the conventional arithmetic technique. Therefore, higher level of security is to be expected by implementing the invention in addition to the prior art.

(Embodiment 2)

The present embodiment is explained with using FIGS. 1 and 12 to 16.

Figure 12:
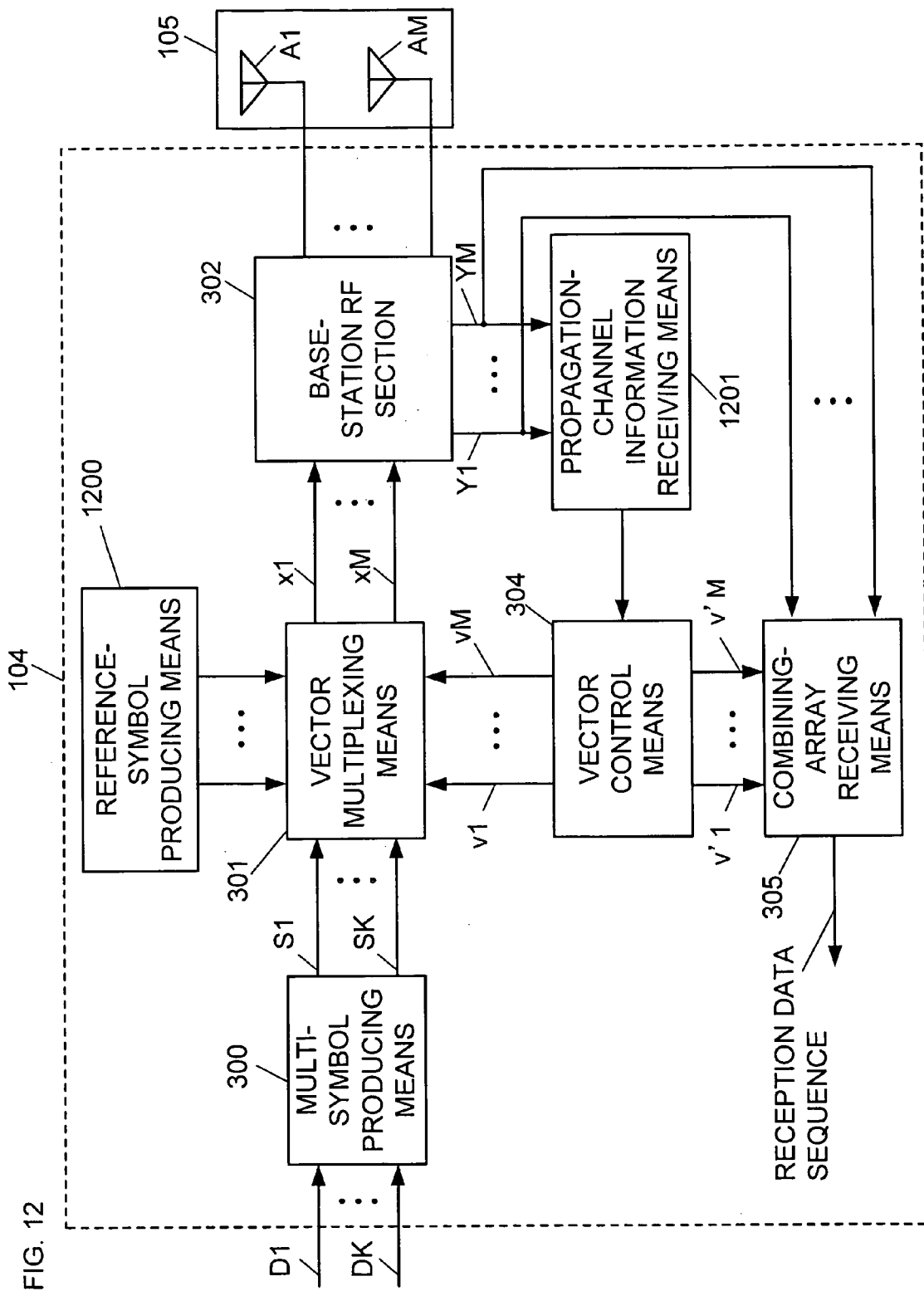
FIG. 12 is a block diagram showing a configuration of a base station according to embodiment 2 of the invention.

The system overall arrangement in the present embodiment is as per the radio communication system 100 shown in FIG. 1, similarly to embodiment 1. FIG. 12 is a block diagram showing a configuration of a base station 101. This is different from embodiment 1 in that having a reference-symbol producing means 1200 and propagation channel information receiving means 1201. The reference-symbol producing means 1200 includes a reference signal previously shared between the base station 101 and the communicating terminal 102, to produce a reference symbol for calculating a propagation parameter. The propagation channel information receiving means 1201 is to take, as an input, a received symbol sequences from a base station RF section 302 and execute frame synchronization, information-source authentication, demodulation of propagation channel information symbol sequence and frame error check process, thus producing a propagation channel matrix.

Figure 13:
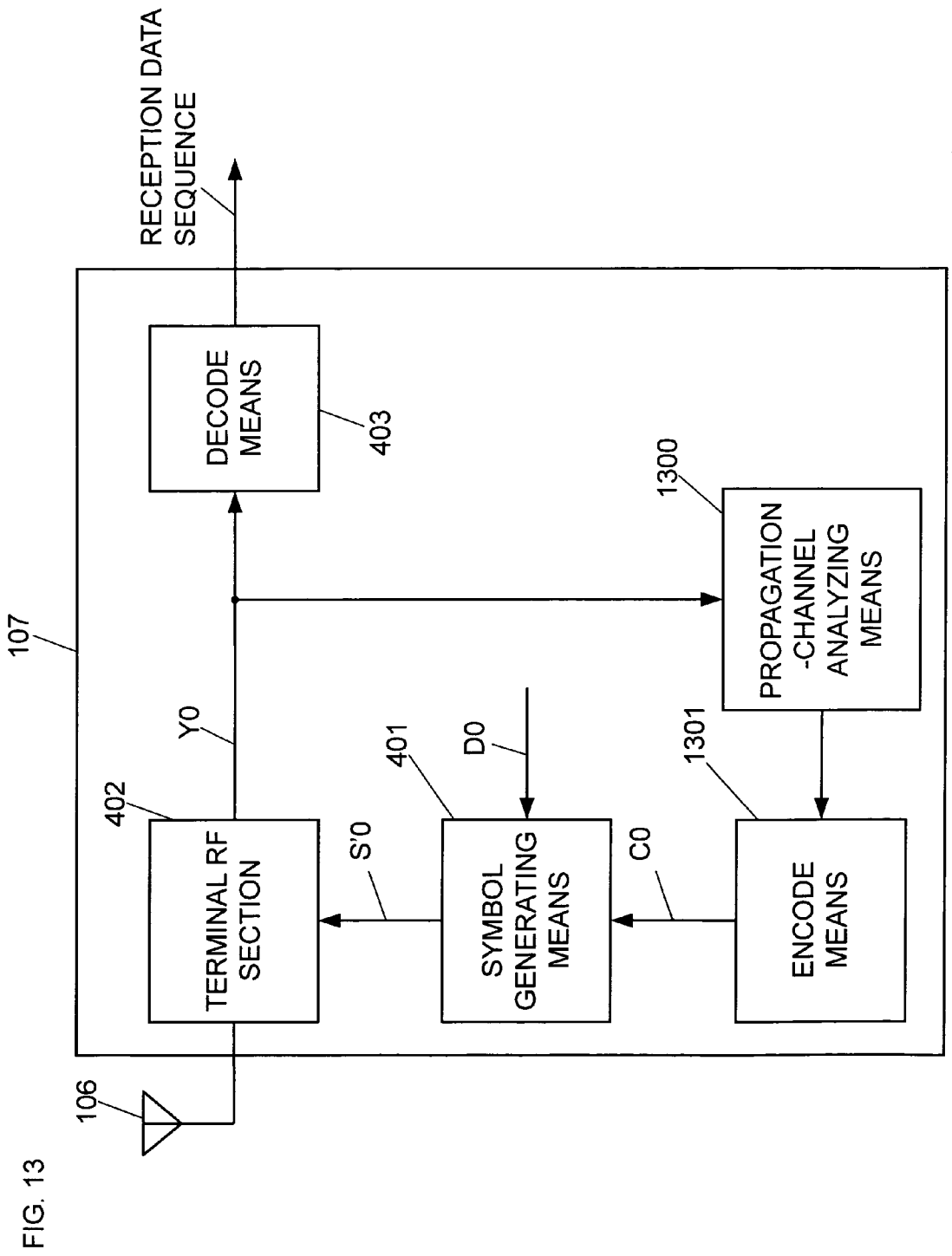
FIG. 13 is a block diagram showing a configuration of a communicating terminal according to embodiment 2 of the invention.

FIG. 13 is a block diagram showing a configuration of the communicating terminal 102. This is different from embodiment 1 in that having propagation channel analyzing means 1300 and encode means 1301. The propagation channel analyzing means 1300 is to produce a propagation channel matrix H as a propagation parameter by use of received symbols. The encode means 1301 is to execute a symbol-mapping process required for radio transmission on the propagation channel matrix data, and produce propagation channel information symbol sequences.

The radio communication system 100 configured as above is explained in detail below mainly on the points different from embodiment 1, with using FIGS. 1, 12 and 13.

At first, transmit signals x'1–x'M containing a reference symbol are sent from the base station 101 through the antenna elements A1–AM of the base station array antenna 105. The transmit signals x'1–x'M containing a reference symbol are to be received by the communicating terminal 102 in order to analyze the propagation channel 103, which includes a reference signal previously shared between the base station 101 and the communicating terminal 102.

Figure 14:
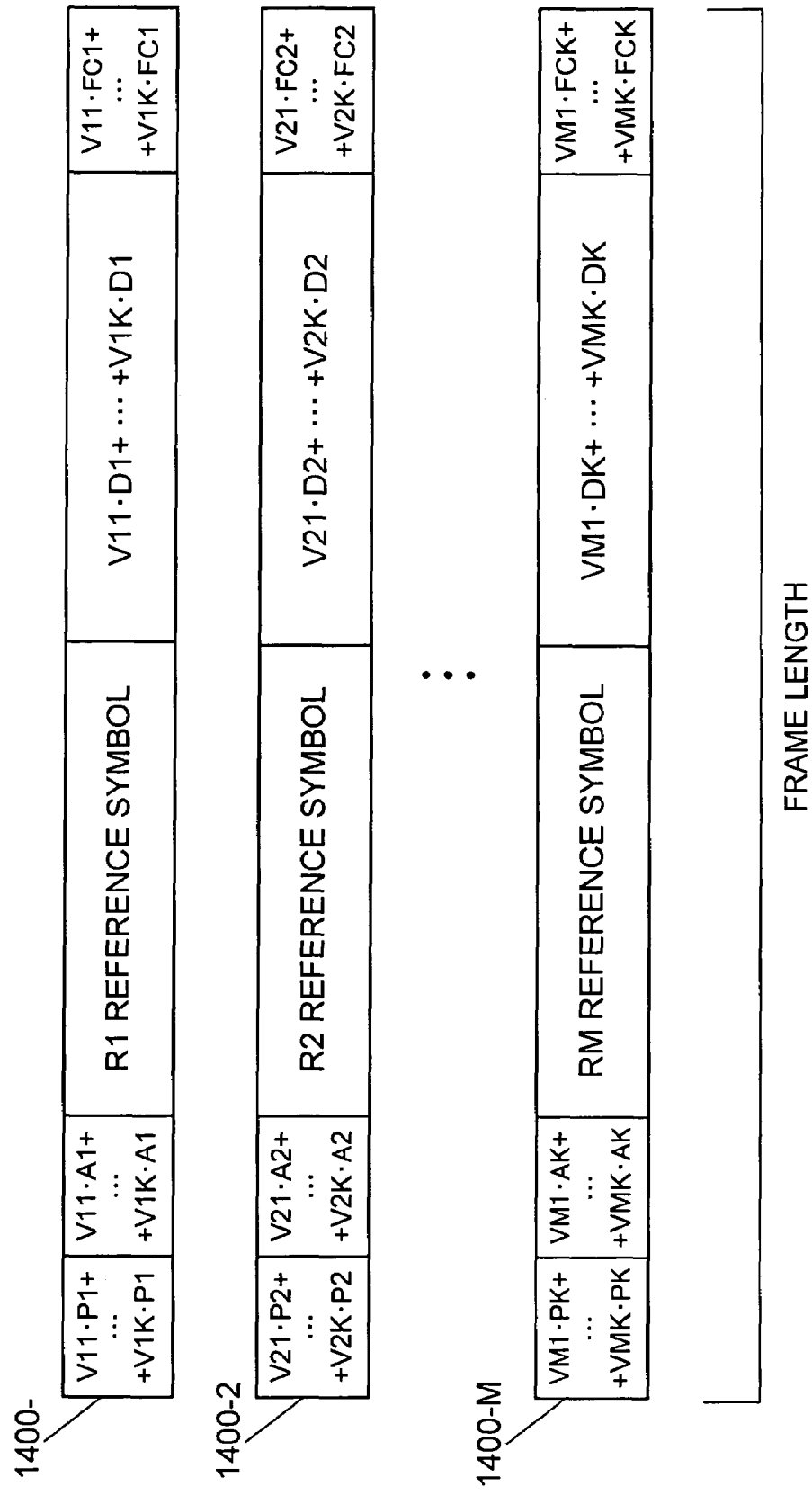
FIG. 14 is a figure showing a frame structure of communication according to embodiment 2 of the invention.

In FIG. 12, the reference-symbol producing means 1200 produces particular reference symbols R1–RM previously agreed between the base station and the communicating terminal 102 and outputs those to the vector multiplexing means 301. The vector multiplexing means 301 produces a vector-multiplexed symbol sequences X'1–X'M that the reference symbols R1–RM are inserted in vector-multiplexed symbol sequences X1–XM which the symbol sequences S1–SK are vector-multiplexed by use of a vector space V. Here, the reference symbols R1–RM are assumably produced from code sequences orthogonal one to another or different in a manner lowering correlation. Incidentally, FIG. 14 shows a structural example of transmission frames 1400-1–1400-M that the vector multiplexing means 301 inserted mutually-different reference symbols R1–RM to the vector-multiplexed symbol sequences X1–XM.

Here, because the data sequences D1–DK are inserted as required, the frame structure may be to send only the reference symbols R1–RM where the vector-multiplexed symbol sequences are used merely for the purpose of analyzing the propagation channel 103.

Figure 15:
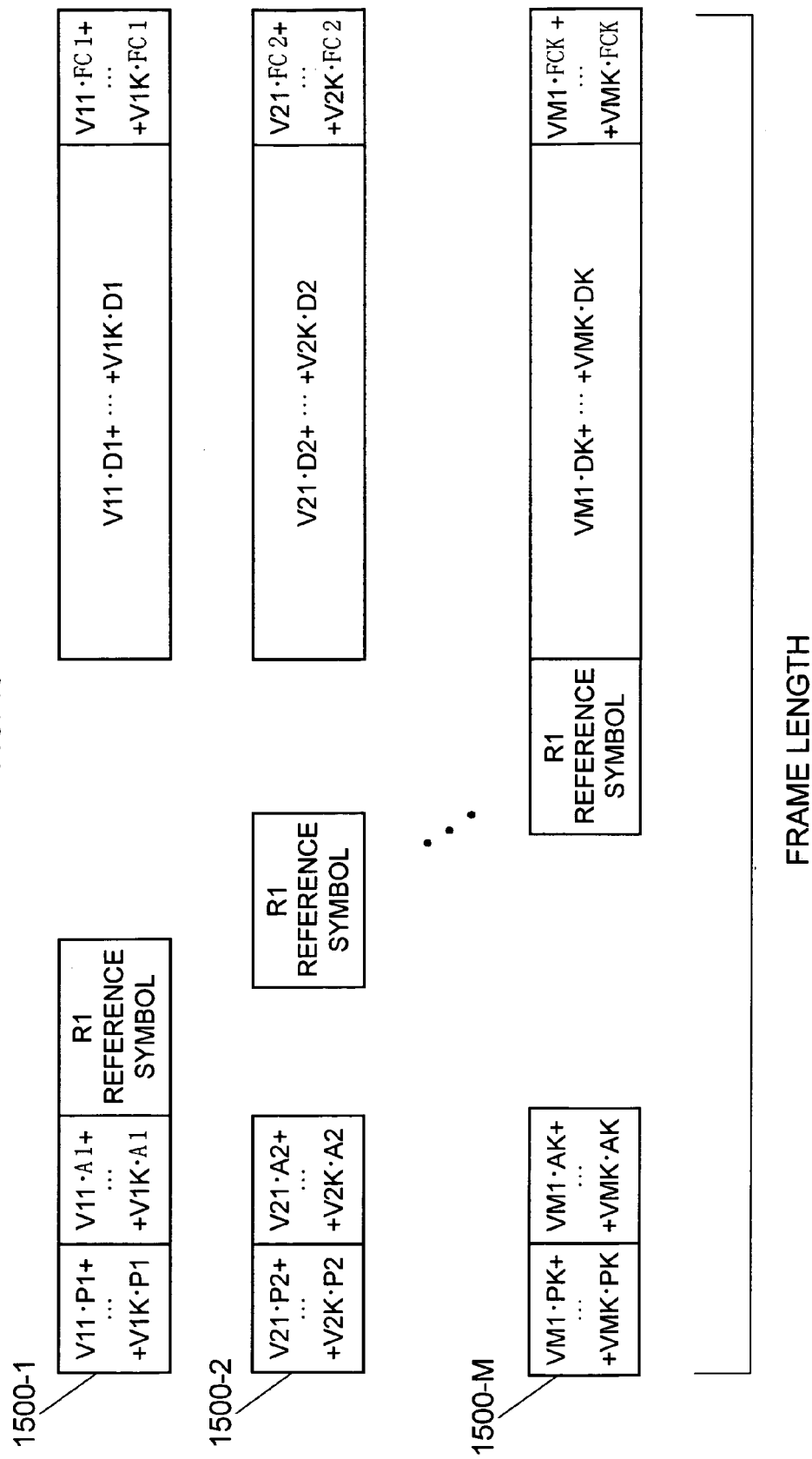
FIG. 15 is a figure showing a frame structure of communication according to embodiment 2 of the invention.

Meanwhile, FIG. 15 shows a structural example of transmission frames 1500-1–1500-M that the vector multiplexing means 301 inserted only the reference symbol R1 to the vector-multiplexed symbol sequences X1–XM. The transmission frames 1400-1–1400-M use the reference symbols R1–RM produced from the code sequences different one from another whereas the frame structure shown in FIG. 15 has reference symbols R1 inserted in the respective frames in their positions shifted in time wherein there is no need to produce reference symbols R1–RM by use of code sequences in the number equal to the number of antenna elements M.

The vector-multiplexed symbol sequences X'1–X'M, made up by the transmission frames 1400-1–1400-M or 1500-1–1500-M produced by the vector multiplexing means 301, are converted in their symbol sequences S1–SM into radio-frequency-band signals, in the base station RF section 302. Those are transmitted as transmit signals x'1–x'M containing reference symbols R1–RM by being put in correspondence to the array antenna elements A1–AM structuring the base station array antenna 105.

Then, at the communicating terminal 102, the propagation channel 103 is analyzed on the basis of the received signals containing the reference symbols. Thereafter, the communicating terminal 102 sends a result of the same to the base station 101. Explanation is made below on the procedure for feeding the analysis result back to the base station 101.

The transmit signals x'1–x'M, sent from the base station array antenna 105, are propagated through the propagation channel 103 and combinedly received at a of receiving point of the terminal antenna 106. The terminal RF section 402 converts the reception signal into a reception symbol sequence Y'0, or baseband signal. By use of the received symbol Y'0, the propagation channel analyzing means 1300 produces a propagation channel matrix H shown in (Equation 1), as a propagation parameter featuring the propagation channel 103. Specifically, where the transmission frames produced by the vector multiplexing means 301 of the base station 101 are structured by mutually-different reference symbols in the number of M as in 1400-1 to 1400-M, the propagation channel analyzing means 1300 of the communicating terminal 102 executes a correlation operation process of multiplying R1–RM separately on the received signal Y'0 by use of the previously-known reference symbols R1–RM, and determines H1–HM as elements of a propagation channel matrix H from the amplitude and phase information of the signal obtained therefrom. This places the propagation channel coefficients of between the antenna elements A1–AM of the base station array antenna 105 and the terminal antenna 106, in correspondence respectively to H1–HM.

Meanwhile, in the case the transmission frame produced in the vector multiplexing means 301 of the base station 101 is structured arranged with reference symbols in positions shifted in time as in 1500-1–1500-M shown in FIG. 5, the propagation channel analyzing means of the communicating terminal 102 also determines amplitude and phase information of a received symbol Y'0 while shifting the timing of sampling, by use of a previously-known reference symbol. This makes it possible to calculate the elements h1–hM constituting the propagation channel matrix H.

Figure 16:
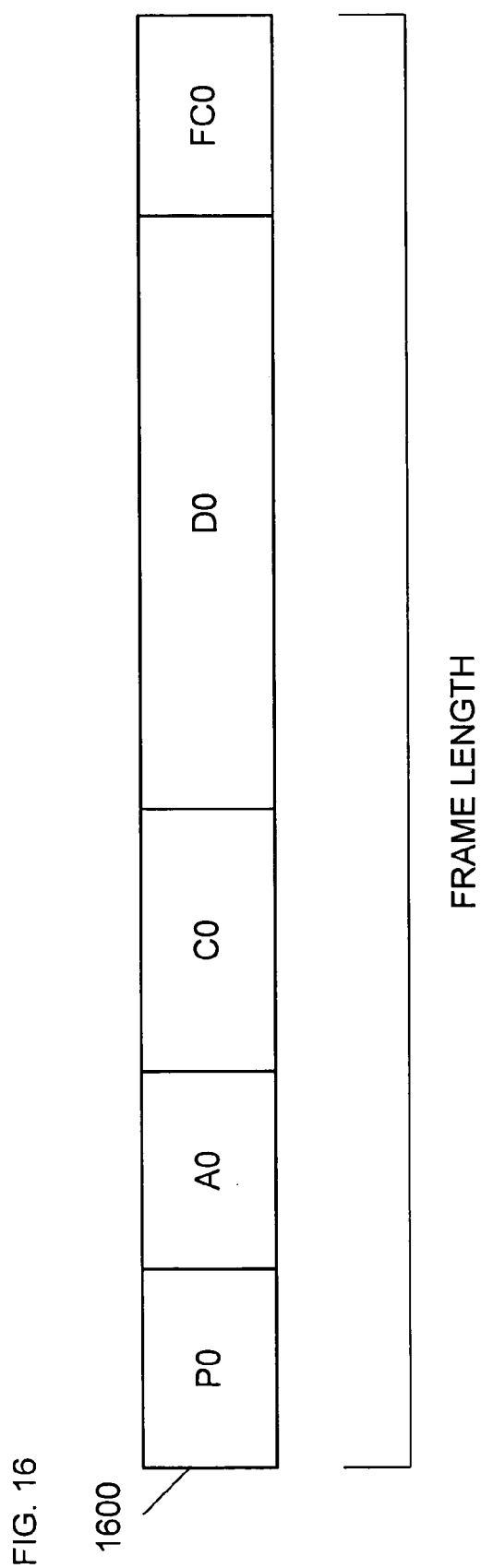
FIG. 16 is a figure showing a frame structure of communication according to embodiment 2 of the invention.

The encode means 1301 takes, as an input, the propagation channel matrix H data produced by the propagation channel analyzing means 1300 and executes a symbol-mapping process required for radio transmission thereby producing a propagation channel information symbol sequence C0. The symbol producing means 401 produces a transmission frame 1600 inserted with a propagation channel information symbol sequence C0 as shown in FIG. 16, and outputs it as a symbol sequence S'0. The terminal RF section 402 converts the symbol sequence S'0 into a radio-frequency-band signal and transmits it as a transmit signal x'0 at the terminal antenna 106.

Then, the base station 101 receives the transmit signal x'0 containing propagation channel information at the base station array antenna 105. The received signal, in the base station RF section 302, is converted into received symbol sequences Y'1–Y'M, or baseband signal. The propagation channel information receiving means 1201 takes, as an input, part or all of the received symbol sequences Y'1–Y'M and executes thereon frame synchronization, information-source authentication, demodulation of the propagation channel information symbol sequence C0 and frame error check process, thus outputting a propagation channel matrix H. With the use of the propagation channel matrix H generated by the propagation channel information receiving means 1201, the vector control means 304 produces a transmit vector space V and receiving vector space V' for the base station 101 to make a transmitting to and receiving from the communicating terminal 102.

According to the arrangement as in the above, by feeding a determined propagation channel matrix H back to the base station 101 by the propagation channel analyzing means 1300 in the communicating terminal 102, the base station 101 is allowed to correctly obtain propagation channel information to the terminal antenna 106 as viewed from the base station array antenna 105. Therefore, because the base station 101 is to calculate a vector space by using a propagation channel matrix H for the downlink as viewed from the base station 101 and carries out a vector-multiplexed transmission, system performance can be maintained even under such a condition that there is an unignorable asymmetry as to the downlink and uplink.

Meanwhile, although the communicating terminal 102 is configured to feed the propagation channel matrix H back to the base station 101, the feedback information may be by notifying another propagation parameter, vector space, etc. to be estimated from the propagation channel matrix H. In this case, the communicating terminal 102 has a function for the FIG. 13 propagation channel analyzing means 1300 to estimate a propagation parameter or vector space by use of a propagation channel space H and feed the result thereof to the base station 101.

Figure 17:
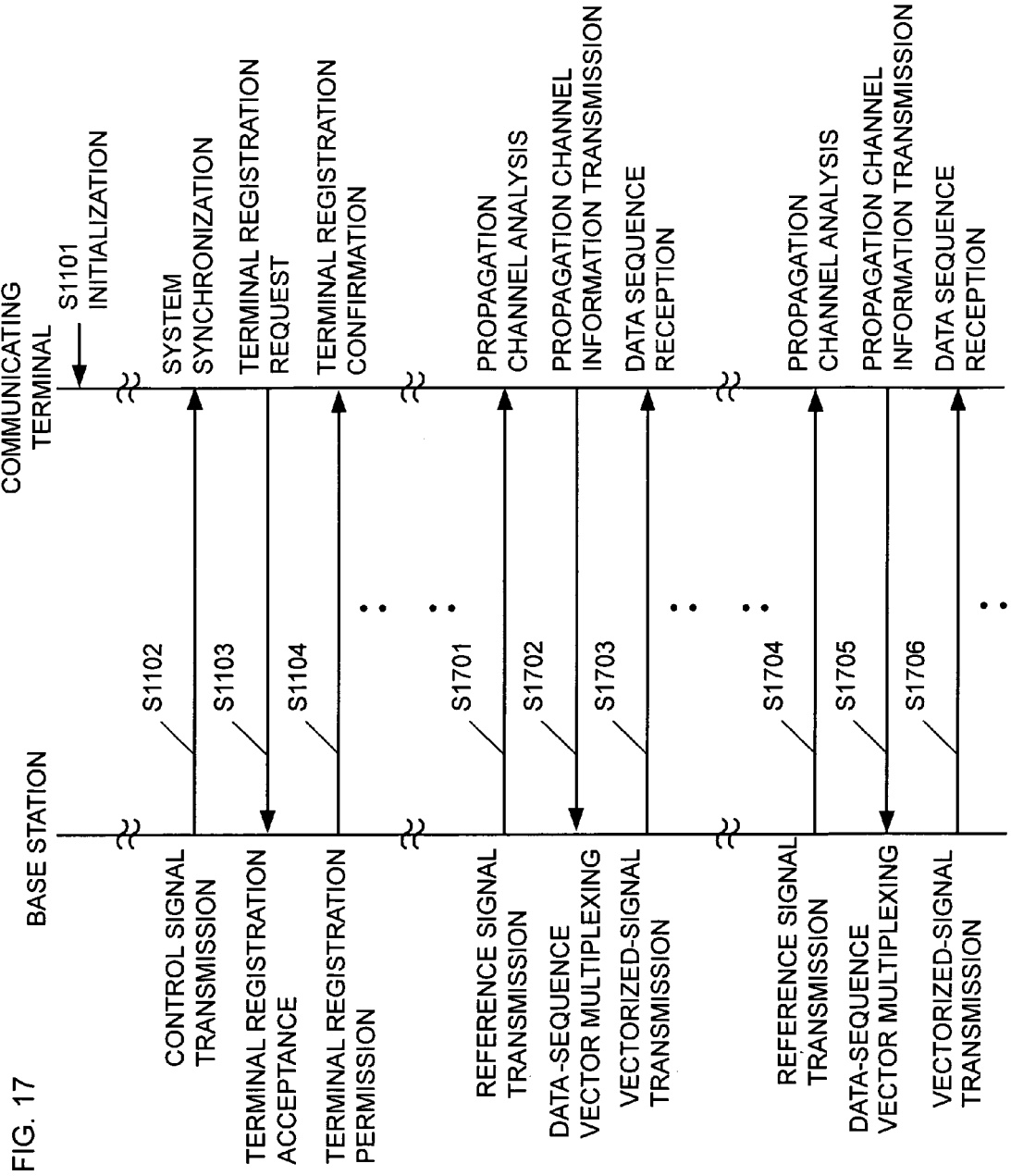
FIG. 17 is a figure showing a procedure of communication according to embodiment 2 of the invention.

Using FIG. 17, explanation is made on the flow of from establishing radio-circuit synchronization to a completion of data transmission in a radio communication system 100 having the base station 101 and communicating terminal 102 arranged for operation as above, from a viewpoint of communication procedure.

Process 10: Initialization of the Base Station 101 and Communicating Terminal 102

The initialization operation is same as embodiment 1.

Process 11: Transmission of Reference Symbols from the Base Station 101

The base station 101 outputs transmit signals X'1–X'M containing reference symbols R1–RM for the communicating terminal 102 to analyze the propagation channel 103 (step S1701). Specifically, the reference-symbol producing means 1200 produces reference symbols R1–RM, while the vector multiplexing means 301 makes up transmission frames inserted with the reference symbols R1–RM and outputs vector-multiplexed symbol sequences X'1–X'M. The vector-multiplexed symbol sequences X'1–X'M, in the base station RF section 302, are converted into radio-frequency-band signals so that transmit signals x'1–x'M containing reference symbols R1–RM are transmitted correspondingly to the antenna elements A1–AM structuring the base station array antenna 105.

Process 12: Transmission of Propagation Channel Information from the Communicating Terminal The communicating terminal 102 waits for the transmit signals X'1–X'M transmitted at the antenna elements A1–AM of the base station 101 and received at the terminal antenna 106 through the propagation channel 103. In the case of receiving at the terminal antenna 106 of the communicating terminal 102, the received signals at the terminal RF section 402 are converted into a received symbol sequence Y'0, or baseband signal. The propagation channel analyzing means 1300 takes the received symbol sequence Y'0 as an input and produces a propagation channel matrix H as a propagation parameter featuring the propagation channel 103 depending upon the amplitude and phase information of the reference symbols R1–RM, in accordance with the transmission frame structure.

Then, the propagation channel matrix H data, in the encode means 1301, is subjected to a symbol-mapping process for radio transmission and then, in the symbol producing means 401, inserted as a part of the data sequence structuring the transmission frame, thus producing a symbol sequence X'0. The symbol sequence X'0 is outputted to the terminal RF section 402 where it is converted into a radio-frequency-band signal, thus being transmitted as a transmit signal x'0 at the terminal antenna 106 to the base station 101 (step S1702).

Process 13: Transmission of a Vectorized Signal from the Base Station 101

At the base station 101, the propagation channel information receiving means 1201 demodulates the received signal of x'0 sent from the communicating terminal 102 and produces a propagation channel matrix H as a propagation parameter featuring the propagation channel 103. Then, the vector control means 304 calculates a vector space V as to the propagation channel matrix H and produces column vectors v1–vk configuring the vector space V.

Thereafter, in the base station 101, when there is an occurrence of data sequences D1–DK to be transmitted to the communicating terminal 102, the multi-symbol producing means 300 executes a symbol-mapping process of the data sequences D1–DK over the complex plane according to modulation scheme and makes up transmission frames 700-1–700-K, thus outputting symbol sequences S1–SK to the vector multiplexing means 301. The vector multiplexing means 301 takes the symbol sequences S1–SK as an input and executes a vector-multiplexing process thereon with use of column vectors v1–vK, to produce vector-multiplexed symbol sequences X1–XM. The vector-multiplexed symbol sequences X1–XM are sent with correspondence thereof to the antenna elements A1–AM structuring the base station array antenna 105. Incidentally, the base station RF section 302 converts the vector-multiplexed symbol sequences X1–XM respectively into radio-frequency-band signals and transmits those as vectorized signals x1–xK through the base station array antenna 105 (step S1703).

Thereafter, the base station 101 and the communicating terminal 102 repeat the vector-multiplexed communication of process 13 and the usual communication.

In the above explanation, process 10 as the initialization process is assumed on the general operation and hence is not requisite procedure for the invention.

Meanwhile, in process 11, the propagation channel was analyzed by transmitting reference signals. This is because the use of a known signal generally allows for estimating a propagation parameter with higher accuracy. Propagation channel analysis is available even where not using especially a reference signal. In other words, the propagation parameter can be estimated by utilization of a control signal, e.g., in process 10, a registration request signal, a registration permission signal or the like.

Incidentally, there is a case to raise a problem upon an occurrence of base station or communicating-terminal movement, because the invention is characterized to transmit a plurality of data sequences with vector multiplexing by utilization of the characteristic of a propagation channel 103 of between the particular communicating terminal 102 and the base station 101 similarly to embodiment 1. However, in this case, the problem can be avoided by repeatedly transmitting and receiving the reference signals as in steps S1704 and S1705 shown in FIG. 17.

In the transmitter apparatus of the invention so far explained, although the estimation accuracy of the propagation channel matrix H if deteriorates causes SINR deterioration to the communicating terminal 102, there is no change in the probabilistic distribution characteristic of SINR to the non-communicating terminal 200. Namely, where the condition is assured that the SINR to the communicating terminal 102 is at or higher than receiving sensitivity, there is no increase of data leak ratio.

Accordingly, as compared to the point that the prior art concerning encryption key generation based on propagation parameters relies directly upon the estimation accuracy of propagation parameter, the transmitter apparatus of the invention can prevent against data leak on the communication physical layer in a state securing the robustness of data transmission, in the radio-wave propagation environment being complex and always varying in time as in a mobile communication environment, thus resultingly providing high level of security.

Furthermore, those processes can be implemented independently of the encryption and decryption using the conventional arithmetic technique. Therefore, higher level of security is to be expected by implementing the invention in addition to the prior art.

Industrial Applicability

The present invention is useful for a transmitter for transmitting information between particular radio stations, and suited for preventing information from leaking to a third party on the radio communication channel.

The invention claimed is:

1. A transmitter apparatus for transmitting an information symbol sequence from a first radio station having an array antenna having M (M is a positive integer and M>1) elements to a second radio station, the transmitter apparatus comprising:

vector control means for producing a plurality of N (N is a positive integer) dimensional vectors, where N≦M; and vector multiplexing means for producing an M number of vector-multiplexed symbol sequences multiplexed by multiplying the plurality of N dimensional vectors by a plurality of symbol sequences containing the information symbol sequence and for transmitting the vector-multiplexed symbol sequences through the array antenna;

wherein the vector control means produces the plurality of N dimensional vectors based on a propagation parameter corresponding to a propagation channel between the first radio station and the second radio station independent of other propagation channels, and the vector control means produces the plurality of N dimensional vectors such that, at the second radio station, at least one symbol sequence containing the information symbol sequence is received from among the plurality of symbol sequences and other symbol sequences are canceled.

2. A transmitter apparatus according to claim 1, further comprising propagation channel analyzing means for producing a propagation channel matrix as the propagation parameter, wherein said vector control means produces the plurality of N dimensional vectors based on singular-value decomposition of the propagation channel matrix.

3. A transmitter apparatus according to claim 1, further comprising propagation channel analyzing means for producing a propagation channel matrix as the propagation parameter, wherein said vector control means produces the plurality of N dimensional vectors based on eigen-value decomposition of a correlation matrix of the propagation channel matrix.

4. A transmitter apparatus according to claim 1, further comprising reference symbol producing means for producing a reference symbol known to the second radio station; and propagation channel information receiving means for receiving information associated with the propagation parameter transmitted from the second radio station and for determining the propagation parameter from the received information, wherein the information associated with the propagation parameter is produced from the propagation parameters, the propagation parameter being determined by the second radio station from the reference symbol transmitted from the first radio station.

5. A transmitter apparatus according to claim 1, wherein the plurality of symbol sequences are, in part or all, symbol-mapped based on modulation schemes different from each other.

6. A transmitter apparatus according to claim 1, wherein the plurality of symbol sequences are, in part or all, spread by code sequences different one from each other.

7. A radio communication method for transmitting an information symbol sequence from a first radio station having an array antenna having M elements to a second radio station, where M is a positive integer and M>1, the radio communication method comprising the steps of:

producing a plurality of N dimensional vectors by the first radio station, where N is a positive integer and N≦M, such that, at the second radio station, at least one symbol sequence containing the information symbol sequence is received from among a plurality of symbol sequences containing the information symbol sequence and other symbol sequences are canceled;

multiplying the plurality of N dimensional vectors by the plurality of symbol sequences containing the information symbol sequence and producing an M number of vector-multiplexed symbol sequences; and transmitting the vector-multiplexed symbol sequences from the first radio station to the second radio station through the array antenna wherein the step of producing the plurality of N dimensional vectors produces the plurality of N dimensional vectors based on a propagation parameter corresponding to a propagation channel between the first radio station and the second radio station independent of other propagation channels.

8. A radio communication method according to claim 7, including the step of transmitting a reference signal from the second radio station to the first radio station, the reference signal including a reference symbol known to the first radio station, wherein, the first radio station calculates the propagation parameter based on the reference symbols.

9. A radio communication method for transmitting an information symbol sequence from a first radio station having an array antenna having M elements to a second radio station, where M is a positive integer and M>1, the radio communication method comprising the steps of:

a reference signal from the first radio station to the second radio station, the reference signal containing reference symbols known to the second radio station;

producing a channel information symbol sequence by the second radio station from the received reference signal, the channel information symbol sequence containing a propagation parameter corresponding to a propagation channel between the second radio station and the first radio station independent of other propagation channels;

transmitting the channel information symbol sequence from the second radio station to the first radio station;

producing a plurality of N (N is a positive integer) dimensional vectors by the first radio station, where $N \leq M$, such that, at the second radio station, at least one symbol sequence containing the information symbol sequence is received from among a plurality of symbol sequences containing the information symbol sequence and other symbol sequences are cancelled based on the propagation parameter extracted from channel information symbol sequences received by the first radio station;

multiplying the plurality of N dimensional vectors by the plurality of symbol sequences containing the information symbol sequence and producing an M number of vector-multiplexed symbol sequences; and transmitting the vector-multiplexed symbol sequences from the first radio station to the second radio station through the array antenna.

\* \* \* \* \*

UNITED STATES PATENT AND TRADEMARK OFFICE
CERTIFICATE OF CORRECTION

PATENT NO. : 7,215,979 B2  Page 1 of 1
APPLICATION NO. : 10/531112
DATED : May 8, 2007
INVENTOR(S) : Yoichi Nakagawa et al.

It is certified that error appears in the above-identified patent and that said Letters Patent is hereby corrected as shown below:

Title Page, Item (56) References Cited, FOREIGN PATENT DOCUMENTS
Change "WO    WO 99/14870    3/1999"
to read -- WO    99/14870    3/1999 --

Column 22
Lines 48 and 49, change "parameters," to -- parameter, --

Signed and Sealed this

Eleventh Day of March, 2008

JON W. DUDAS
*Director of the United States Patent and Trademark Office*